US012668362B2

(12) United States Patent
Voelkner

(10) Patent No.: US 12,668,362 B2
(45) Date of Patent: Jun. 30, 2026

(54) DISPERSION SYSTEM AND VEHICLE HAVING THE SAME

(71) Applicant: SKYFLUSH, Laupheim (DE)

(72) Inventor: Joachim Voelkner, Laupheim (DE)

(73) Assignee: SKYFLUSH, Laupheim (DE)

( * ) Notice: Subject to any disclaimer, the term of this patent is extended or adjusted under 35 U.S.C. 154(b) by 0 days.

(21) Appl. No.: 18/700,147

(22) PCT Filed: Oct. 10, 2022

(86) PCT No.: PCT/EP2022/078019
§ 371 (c)(1),
(2) Date: Apr. 10, 2024

(87) PCT Pub. No.: WO2023/061897
PCT Pub. Date: Apr. 20, 2023

(65) Prior Publication Data
US 2025/0236389 A1     Jul. 24, 2025

(30) Foreign Application Priority Data

Oct. 11, 2021     (EP) .................................... 21201835

(51) Int. Cl.
*B64D 1/16*          (2006.01)
*A62C 3/02*          (2006.01)
(52) U.S. Cl.
CPC .............. *B64D 1/16* (2013.01); *A62C 3/0242* (2013.01)
(58) Field of Classification Search
CPC ................................ B64D 1/16; A62C 3/0242
See application file for complete search history.

(56) References Cited

U.S. PATENT DOCUMENTS 3,698,480 A      10/1972  Newton
7,165,627 B2 *    1/2007  Hutter .................. A62C 3/0242
                                                     169/44

(Continued)

FOREIGN PATENT DOCUMENTS

WO            02/24529 A1     3/2002

OTHER PUBLICATIONS

International Search Report and Written Opinion for corresponding International Application No. PCT/EP2022/078019 dated Dec. 8, 2022.

(Continued)

*Primary Examiner* — Philip J Bonzell
(74) *Attorney, Agent, or Firm* — Greer, Burns & Crain, Ltd.

(57) ABSTRACT

A dispersion system for a vehicle, wherein the vehicle has at least one door opening. The dispersion system comprises at least two tank modules including a reservoir for storing a medium to be dispersed, each module configured to fit through the door opening; a door configured to fit into one of the at least one door opening and comprising a through hole; and a dispersion unit having a dispersion channel in fluid communication with the reservoir of the modules and the through hole of the door. Each tank module includes an outlet channel in fluid communication with the dispersion channel; and a closure closing the reservoir with respect to the outlet channel in a fluid tight manner. A controller is configured to individually open the closure of each module. Also a vehicle with such a dispersion system.

17 Claims, 11 Drawing Sheets

(56) References Cited

U.S. PATENT DOCUMENTS

| | | | |
|---|---|---|---|
| 7,284,727 B2 * | 10/2007 | Nolan .................... | B64D 11/00 |
| | | | 244/137.1 |
| 8,096,323 B2 * | 1/2012 | Von Mohos ............. | B64D 1/16 |
| | | | 137/266 |
| 8,978,703 B2 * | 3/2015 | Von Mohos ............. | B64D 1/16 |
| | | | 169/53 |
| 9,750,963 B2 * | 9/2017 | Nelson ................ | A62C 3/0228 |
| 2005/0072880 A1 | 4/2005 | Nolan | |
| 2006/0260826 A1 * | 11/2006 | Hutter ..................... | B64D 1/16 |
| | | | 169/53 |
| 2008/0029646 A1 * | 2/2008 | Von Mohos ............. | B64D 1/22 |
| | | | 244/129.1 |
| 2012/0132308 A1 * | 5/2012 | Von Mohos ............. | B64D 1/16 |
| | | | 137/899.2 |

OTHER PUBLICATIONS

European Search Report for corresponding European Patent Application No. 21201835.2 dated Apr. 5, 2022.

* cited by examiner

DISPERSION SYSTEM AND VEHICLE HAVING THE SAME

CROSS-REFERENCES TO RELATED APPLICATIONS

This application is a national phase of International Patent Application No. PCT/EP2022/078019, filed Oct. 10, 2022, which claims priority under 35 U.S.C. §§ 119 and 365 to European Application No. 21201835.2 filed Oct. 11, 2021, the entire disclosures of which are incorporated herein by way of reference.

FIELD OF THE INVENTION

The present invention relates to a dispersion system for a vehicle and a vehicle comprising such dispersion system. Particularly, the present invention relates to a dispersion system having a plurality of tank modules, each comprising a reservoir, an outlet channel and a closure closing the reservoir with respect to the outlet channel, as well as a vehicle comprising such dispersion system.

BACKGROUND OF THE INVENTION

In recent years large wildfires became more frequent and the amount of water, fire extinguishing agent, and/or fire retardant that is required to fight and extinguish such fires increases significantly. Thus, communities, forestry and fire departments invested into specialized aircrafts capable of transporting water and other extinguishing agents and capable of dropping them over the fire.

However, such aircrafts are not only expensive, but they are also only used a few days or weeks per year. Due to the special equipment installed inside the aircraft, their use for other purposes is very limited.

It is therefore an object of the present invention to provide a cost-effective dispersion system and vehicle that allow multipurpose usage of the vehicle.

SUMMARY OF THE INVENTION

This object may be achieved by a dispersion system according to one or more embodiments described herein, and a vehicle according to one or more embodiments described herein.

According to a first aspect to better understand the present disclosure, a dispersion system for a vehicle having at least one door opening and an interior space comprises at least two tank modules including a reservoir for storing a medium to be dispersed, each tank module being configured to fit through the door opening. Each of the tank modules is, hence, dimensioned smaller than the usable clearance of the vehicle's door opening. Most vehicles have standardized door openings or at least door openings of a minimum size, for example, for passengers or cargo goods and containers to enter and leave the vehicle, which can be used as a reference for the dimensions of the tank modules.

The dispersion system further comprises a door configured to fit into one of the at least one door opening and (the door) comprising a through hole. The dispersion system further comprises a dispersion unit having a dispersion channel in fluid communication with the reservoir of the at least two tank modules and the through hole of the door. The dispersion unit can be disposed close to, at or in the door, in order to allow a medium in the dispersion channel to leave the vehicle through the through hole in the door. The location of the dispersion unit close to, at or in the door depends on operational conditions, the available installation space, the mounting capabilities of the door frame (strong enough for carrying a door including the dispersion unit, etc.) or similar constraints.

Furthermore, each tank module further comprises an outlet channel in fluid communication with the dispersion channel, and a closure closing the reservoir with respect to the outlet channel in a fluid tight manner. Thus, a fluid communication is achieved from each reservoir of the at least two tank modules via the outlet channel and the dispersion channel to the through hole in the door. The medium stored in the reservoir can be discharged from the reservoir into the outlet channel, from where it moves to the dispersion channel. The medium is then dispersed by the dispersion unit via the through hole in the door to an ambient environment of the vehicle.

The dispersion system further comprises a controller configured to individually open the closure of each tank module. This allows a controlled discharge of the medium stored in the reservoir of each tank module. The controlled discharge allows discharging the medium from only one reservoir, a predefined number of reservoirs or all reservoirs at once. This facilitates dispersing the medium at different locations that the vehicle passes or a single location, respectively. In addition, the weight balance of the vehicle can be more stable, if the medium in the reservoirs is not released (discharged) at once. For example, the releasing of the medium can start with opening the closure of every second reservoir and (shortly) thereafter opening the closure of the remaining reservoirs. Of course, any order of opening the closures of the reservoirs or opening all closures at ones can be implemented in the controller.

The dispersion system allows easy re-modification of the vehicle due to the modularity of the tank modules. Specifically, any type of vehicle can be employed, which either provides an empty cargo space or has certain equipment installed in the interior space of the vehicle that can be removed fast. For example, an aircraft, train or bus may include passenger seats, galleys (on-board kitchens), lavatories or the like that are usually removably installed, and the removal (deinstallation) of the passenger seats, etc., can be performed fast due to only a few fasteners holding such equipment in the vehicle. Once the interior space of the vehicle is freed from the passenger seats and/or other equipment, the tank modules can be brought through the door opening of the vehicle into the interior space and can be installed at the space, where the passenger seats and/or other equipment were located. Likewise, heavy trucks and (agricultural) trailers as well as the above listed vehicles can comprise a cargo space accessible via a (cargo) door, into which the at least two tank modules can be installed.

Therefore, a huge number of different types of vehicles can be employed to be reconfigured by installation of the dispersion system. Depending on the type of usage, the dispersion system can be installed in an air freighter, a passenger aircraft, a bus, a train, a heavy truck or trailer or the like, which is usually employed for different purposes. Only when a dispersion system is required, the purpose of the vehicle is temporarily changed. This saves costs since the vehicle is usable for a plurality of purposes and, hence, has less downtimes.

The dispersion channel as well as the outlet channel are to be understood as any type of structure, such as a duct, pipe or the like, that is capable of guiding the medium from the reservoir towards the dispersion unit and, hence, through the through hole in the door. For instance, the dispersion channel and/or outlet channel can be a duct of a closed cross-section having any suitable shape, such as a trapezoidal, rectangular, circular, elliptical, polygonal shape, etc. A trapezoidal cross-section can have a wider top width than bottom width, which facilitates guiding the medium through the respective channel and also avoids the medium sticking in (rectangular) corners of the channel.

The door of the dispersion system can be used to replace an original vehicle door. For example, a vast number of vehicles have standardized doors, such as aircrafts, trains, buses and the like, which usually completely close the door opening of the vehicle. The dispersion system can be provided with a corresponding door that fits into the door opening of the particular vehicle to be reconfigured and can be mounted to the hinges and/or door frame of the vehicle. For instance, in aircrafts, trains and buses, the disassembly of the door and installation of the door of the dispersion system can be done in about or even less than one hour. Although the dispersion system has to be equipped and maintained with a particular door fitting to the dedicated vehicle, the provision of such door is still less cost intensive than an entire single-purpose vehicle.

The dispersion unit cooperating with the through hole of the door provides for reconfiguration of the vehicle to a dispersing vehicle in a fast and easy manner. Simply by replacing the original door with the door and the dispersion unit disclosed herein provides for a dispersion opening in the vehicle. During replacement of the door, any equipment to be deinstalled from the vehicle can be removed through the door opening and the at least two tank modules can be brought into the interior space of the vehicle in an easy manner.

The dispersion system can optionally comprise more than one door and/or more than one dispersion unit, in order to disperse the medium from different positions of the vehicle.

The at least two tank modules can be arranged in the interior space of the vehicle along a longitudinal direction of the vehicle, i.e. a driving direction of the vehicle. Alternatively or additionally, the at least two tank modules can be arranged in the interior space of the vehicle along a cross-sectional direction of the vehicle. In other words, the at least two tank modules can be arranged side-by-side along a longitudinal direction of the vehicle and/or along a cross-sectional direction of the vehicle. These ways of arranging the at least two tank modules allow balancing the weight brought into the vehicle by the dispersion system and particularly by the medium stored in the reservoir of each tank module.

The outlet channel of each tank module may be configured to be fluidly connected to the dispersion unit, particularly the dispersion channel thereof, and/or to an outlet channel of another tank module. For instance, if the tank modules are installed inside of the vehicle along a line (e.g., along the longitudinal and/or cross-sectional direction of the vehicle), the outlet channels of all tank modules may be aligned, so that they form a continuous outlet channel, once connected to each other. As an example only, each outlet channel of each tank module may have the same cross-sectional dimensions, so that the outlet channels of all tank modules connected to one another form a single continuous outlet channel having these cross-sectional dimensions. This allows installation of each tank module in any order, which facilitates installation of the dispersion system. As a further example, the dispersion channel of the dispersion unit may be provided with the same cross-sectional dimensions as the outlet channels, so that the outlet channels and the dispersion channel can be connected in a fluid tight manner fast and easy and with the same equipment (tools, sealant, fasteners, etc.) as the outlet channels of the tank modules.

Of course, the tank modules may have a particular order to be installed inside of the vehicle starting at the dispersion unit and with increasing distance from the dispersion unit. Such tank modules may further be equipped with an outlet channel with decreasing cross-section along this order, since the outlet channel of the tank module having the greatest distance from the dispersion unit does not require a large cross-section compared to the cross-section of the dispersion channel and the cross-section of the outlet channel closest to the dispersion channel. For instance, if the medium stored in the reservoirs of all tank modules (or at least a plurality of the tank modules) is released at once, the amount of medium flowing through the outlet channels increases towards the dispersion channel. Such differently sized outlet channels decrease the overall weight of the dispersion system. On the other hand, they require a particular installation order and, hence, number of tank modules and fixed size of the resulting dispersion system.

The medium stored in the reservoirs of the tank modules can simply be water, for example, for extinguishing a fire or watering agricultural land. On the other hand, the medium can be a mixture of different components, for example, forming a fire extinguishing medium or fire retardant. The medium mixture or slurries can also include particular compounds to be dispersed, such as fishes or fish eggs (to populate a lake or the like), seeds, crops or spores (to be dispersed over agricultural country, forestry, etc.), algae or bacteria (to be dispersed over waters, including fighting pollution or (oil) contamination of water), herbicides or pesticides (to be dispersed over agricultural country, forestry or along train tracks or roads, etc.). Such compounds may be water-based or be based on another fluid.

Besides liquid media, a powdery or granular medium, such as granules, powders, pellets, chippings, fibers, and the like, can also be dispersed with the dispersion system. Particularly, a powdery or granular medium can be conveyed by a stream of (pressurized) gas or air. Exemplary powdery or granular media are dry powder, solid extinguishing agent, lime powder, basalt powder, cloud seeding powder (for weather modification, hail prevention, etc.), fertilizer, herbicides or pesticides, or the like.

In an implementation variant the closure can comprise a raising device raising the closure from a closed position to an open position, wherein, in the open position, the reservoir is in fluid communication with the outlet channel. The raising device can be a simple frame, that is movable towards and away from the outlet channel. Alternatively or additionally, the raising device can be a hinge structure that hinges the closure between the closed position to the open position.

In another implementation variant, the outlet channel can comprise a top wall with an opening. In other words, the outlet channel transitions into the reservoir and vice versa via the opening in the top wall.

Optionally, the closure can comprise an elastic flap covering the opening of the outlet channel, particularly the opening in the top wall of the outlet channel. The elastic flap may be made from a plastic and/or rubber material and can optionally include reinforcing fibers and/or woven/non-woven fabrics. The elastic flap can be sized to correspond to the dimensions of the opening of the outlet channel or can be sized larger than the opening of the outlet channel, in order to close the opening.

In yet another implementation variant, the elastic flap can be substantially flat and can seal the reservoir with respect to the outlet channel, when the closure is in a closed position. For instance, the elastic flap can cover a circumference of the opening of the outlet channel, such as a frame surrounding and/or forming the opening, or the top wall of the outlet channel having the opening. Alternatively, the elastic flap can fit into the opening of the outlet channel, such as a frame surrounding and/or forming the opening.

Furthermore, the elastic flap can become bulgy, when the closure moves from the closed position towards an open position. This bulgy form may be achieved due to the elasticity of the flap and gravity acting on the flap. Alternatively or additionally, the weight of the medium stored in the reservoir can act on the elastic flap, when the closure is in the closed position and moving (raising) towards the open position. Due to the elasticity of the flap, the flap sags or droops under its own weight and/or the weight of the medium, hence, leading to the bulgy form of the flap. Thus, the weight of the medium (as well as the flap itself) can be used to facilitate opening the closure and releasing the medium into the outlet channel.

Alternatively or additionally, the elastic flap, when the closure moves from the closed position towards an open position, can bulge to such an extent that the flap moves into the outlet channel. In other words, the shape of the flap can be changed from the flat form to a bulgy (curved) form, so that a width and/or length of a projected area of the flap becomes smaller than a width and/or length of the opening in the outlet channel. Thus, the flap can move through the opening into the outlet channel. This change of shape and moving into the outlet channel can be facilitated and accelerated by the weight of the medium stored in the reservoir. As indicated above, when the weight of the medium bulges the flap, it may also push the flap from the reservoir space into the outlet channel, i.e., through the opening in the outlet channel. Thus, a rapid release of the medium into the outlet channel can be achieved.

In a further implementation variant, at least one corner or edge of the flap can be coupled to the closure, particularly the raising device, so that moving the closure from a closed position to an open position leads to the bulging of the flap. For instance, when raising the closure, the at least one corner or edge of the flap coupled to the closure is also raised. Since the weight of the medium (as well as the weight of the flap itself) acts on the elastic material of the flap, the at least one corner or edge rises above the remainder of the flap leading to the bulged (curved) form of the flap.

As an example only, the at least one corner or edge of the flap can be coupled to the closure, particularly the raising device, via one or more springs or ropes. Thus, when the closure raises, a tension is applied to the one or more springs or ropes acting on the corner or edge of the flap. This tension lifts the corner or edge of the flap starting the opening process of the flap and closure.

Furthermore, after dispensing (releasing) the medium into the outlet channel, the one or more springs or ropes can lift the flap in its closed position again. For instance, due to the tension force of the one or more springs and/or by further raising the raising device, the flap can be pulled back to the closed position, for example, through the opening of the outlet channel into the reservoir.

Moreover, the flap can be coupled to the closure, particularly the raising device, by one or more springs and one or more ropes or strings. Specifically, the rope(s) or string(s) may have a length corresponding to a length of the one or more springs in an extended condition. Thus, the flap can bulge and move through the opening in the outlet channel due to the elasticity of the one or more springs. The one or more springs will then reach a length corresponding to the length of the one or more ropes or strings, so that the flap hangs at the one or more ropes or strings and cannot move further away from the closure, particularly the raising device.

The raising device, hence, can raise or lift away from the opening in the outlet channel to reach an open position, in which the flap bulges and moves into the outlet channel. After dispensing (releasing) the medium into the outlet channel, the closure (raising device) can be raised into an even higher position above the opening in the outlet channel, thereby pulling the flap back through the opening in the outlet channel and into the reservoir. This pulling back of the flap can be facilitated due to the rather non-extendable one or more ropes or strings.

In yet a further implementation variant, the flap can be mounted to the reservoir and/or the outlet channel at only a portion of the circumference of the flap. This mounted portion of the circumference of the flap will act as a hinge for the flap due to the elasticity of the flap. The at least one corner or edge of the flap coupled to the closure can then be positioned opposite to the mounted portion of the circumference of the flap. This allows a fast bulging of the elastic flap and, hence, a fast opening of the closure and release of the medium into the outlet channel, while the flap does not entirely enter or fall into the outlet channel.

In another implementation variant, the flap can comprise at least one ridge along an edge of the opening of the outlet channel, for example, at a surface of the flap facing the reservoir and/or the outlet channel. Such ridge provides stability to the flap along the sealing surface (area) of the flap. Therefore, sealing of the fluid connection between reservoir and outlet channel is improved, while maintaining elasticity of the remainder of the flap.

For instance, the ridge can be formed in such a manner that it extends from a general surface of the flap into the opening of the outlet channel. Thereby, the ridge can touch a circumference (rim) of the opening of the outlet channel, so that an additional sealing surface is provided. Likewise, the ridge can be formed on an opposite surface of the flap facing into the reservoir space. This facilitates stabilization of the flap, particularly at an outer circumference region of the flap, so that the flap is stabilized in the closed position of the closure and a proper sealing capability of the flap is achieved.

In addition, the ridge may contact a portion of the closure, particularly the raising device, such as a frame or the like. The interaction between frame and ridge achieves stabilization of the flap, since the flap is hindered from bulging and/or slipping under the closure (frame) in a direction substantially parallel to the plane formed by the flap, and his thereby hindered from moving into the opening of the outlet channel. Once the closure raises towards its open position, the additional stabilization provided by the ridge ceases when it is not in contact with the closure anymore, so that the flap may faster receive a bulgy form and, hence, allows a fast release of the medium into the outlet channel. Likewise, after releasing the medium and the flap being brought back to the closed position, the closure, particularly the raising device, can be brought back to the closed position, where it contacts the ridge of the flap and achieves stabilization thereof again.

In yet another implementation variant, the flap can comprise one or more sealing lips, in order to provide additional sealing capabilities to the flap. Optionally, a circumference of the opening of the outlet channel or a portion of the closure can include a corresponding groove, into which one of the one or more sealing lips can fit when the closure is in the closed position, i.e., when the flap closes the opening in the outlet channel.

In a further implementation variant, the raising device can comprise at least one actuator and/or rocker configured to raise the closure. For instance, the actuator and/or rocker can be configured to raise the closure from the closed position to the open position. Of course, the actuator and/or rocker can further be configured to lower the closure from the open position to the closed position. The actuator can be a motor, a hydraulic or pneumatic piston, a spring or the like providing a force large enough for the closure to be opened. This force has to be large enough to open the closure against the weight of the medium stored in the reservoir. For instance, the actuator and/or rocker may be capable of lifting any structure and frame of the closure, such as the raising device, as well as at least a corner or edge of the elastic flap against the weight of the closure, elastic flap and medium lying on the elastic flap. Once the flap achieves a bulgy shape, the elastic flap may move through the opening into the outlet channel by the weight of the medium, so that the actuator and/or rocker do not have to move any further.

In yet a further implementation variant, the dispersion system can further comprise a supply line fluidly connecting a fill nozzle or filler pipe with each reservoir of the at least two tank modules. This allows refilling the reservoirs of all tank modules. For example, each of the at least two tank modules can optionally comprise a supply valve configured to be connected to the supply line and closing and opening the fluid connection between the supply line and the reservoir. Thus, the reservoir of each tank module can be filled individually.

Furthermore, each tank module may be equipped with a sensor or floating gauge and configured to sense a fill level of the reservoir. Once a maximum fill level is reached during a filling process, the supply valve can be closed, in order to avoid overfilling. The closing of the supply valve can optionally be triggered and/or performed by the controller, for example, if the controller receives a signal from the sensor or floating gauge.

The controller can also be configured to open the supply valve. This allows filling all reservoirs simultaneously or in a particular order, in order to maintain a weight balance of the dispersion system and, hence, of the vehicle.

Alternatively or additionally, the floating gauge can mechanically close the supply valve or may form the supply valve. For instance, a floating ball can be arranged at an opening of the supply line opening into the reservoir. Once the maximum fill level is reached, the floating ball can be pressed against the opening of the supply line, thereby closing the supply line and acting as a supply valve.

Furthermore, each tank module or reservoir can comprise a level drain, which fluidly connects the reservoir with the outlet channel. Thus, even in case of overfilling the reservoir, only the maximum allowable amount of medium will be stored in the reservoir.

In another implementation variant, the dispersion system can further comprise a ram air channel connecting a ram air source with the outlet channel and/or each reservoir of the at least two tank modules. The ram air source can be any source of pressurized air or gas having a pressure higher than the pressure inside of the reservoir and/or the outlet channel. For instance, the ram air source can be a legacy ram air channel already installed in the vehicle, to which the ram air channel of the dispersion system is fluidly connected.

The ram air (or other pressurized air or gas) can be employed to provide pressurized air to the outlet channel, so that any medium present in the outlet channel is conveyed towards the dispersion unit and, hence, via the through hole in the door to the outside of the vehicle. This volume flow of air or gas conveys a liquid as well as a dry medium out of the vehicle in an easy and cost-effective manner. In addition, the mass flow of air or gas through the outlet channel can suck the medium out of the reservoir, for example, if the flap enters the outlet channel and forms a Venturi tube inside of the outlet channel.

Furthermore, the ram air (or other pressurized air or gas) can be employed to provide pressurized air to the respective reservoir of the at least two tank modules. Thus, the ram air can be used to press the medium out of the reservoir into the outlet channel. If the outlet channel is not (yet) pressurized, the application of ram air into the reservoir can even be employed to open the closure or at least facilitating the opening of the closure, such as supporting and/or accelerating the bulging of the flap. If ram air is provided to the outlet channel and the reservoirs, an equal pressure can be achieved in the outlet channel and reservoirs, so that the medium enters the outlet channel due to gravity and/or the Venturi effect and is further conveyed by the volume flow of ram air through the outlet channel towards the dispersion unit.

In yet another implementation variant, the door can comprise a ram air inlet and/or a ram air scoop forming the ram air source and configured to collect ambient air from an environment outside of the vehicle and to guide the ambient ram air into the ram air channel. Such ram air inlet and/or scoop provided on the door allows installing the dispersion system independent of any source of pressurized air or gas. Thus, the dispersion system is a complete unit/assembly functioning in any vehicle once installed.

Alternatively or additionally, a ram air valve can be installed in the ram air channel or at the ram air source. For instance, a ram air valve can be installed in the ram air channel close to the beginning of the outlet channel (e.g., at the tank module having the greatest distance to the dispersion unit).

Also alternatively or additionally, each tank module can further comprise a ram air valve configured to regulate a volume flow of ram air from the ram air channel into the respective reservoir. Thus, a ram air valve can be installed in the ram air channel upstream of each reservoir. For instance, the ram air channel can have branches, the number of which equals the number of reservoirs. A ram air valve can be installed in each of these branches. Furthermore, the controller can be further configured to control the opening and closing of each ram air valve individually and/or simultaneously.

In addition, the ram air valve can further be configured to close after the medium has been released into the outlet channel, and ram air can be guided (solely) through the outlet channel. This accelerates releasing and, hence, dispersing of the medium from the reservoir and out of the vehicle.

In a further implementation variant, at least one tank module can further comprise a storage space for a powdery and/or granular agent (i.e., a dry medium). Such a storage space for a dry medium can also be contemplated as a second reservoir in the at least one tank module. Of course, the (first) reservoir disclosed herein can also be used for storage of a dry medium. Employing two reservoirs allows mixing the media stored in each reservoir, particularly shortly before releasing the media from the tank modules and into the ambient of the vehicle. The mixing may take place in the reservoir and/or the outlet channel and/or the dispersing unit. Alternatively, one medium is released first, while the other medium is released later, for example over a different location or after passing with the vehicle the same location, where the first medium has been dispersed.

In yet a further implementation variant, the at least one tank module can further comprise a conveyor configured to convey the powdery and/or granular agent (dry medium) towards the dispersion unit and/or the outlet channel. The conveyor can be any type of conveyor, including a spiral conveyor, a belt conveyor, a fan or blower as well as a ram air nozzle arranged in the outlet channel blowing the dry medium through the outlet channel. Additionally or alternatively, a clapper or the like swirling the dry medium in the storage space for a powdery and/or granular agent and/or in the outlet channel and/or in the dispersion unit can be installed, in order to facilitate blowing the dry medium out of the vehicle. Specifically, a clapper or the like arranged in the dispersion unit facilitates swirling the dry medium into the ram air or other volume flow streaming through the outlet channel and the dispersion channel, thus achieving a homogeneous distribution of dry medium when leaving the vehicle.

Alternatively or additionally, the storage space for a dry medium can be arranged inside of the outlet channel. This location of the storage space facilitates swirling of the dry medium and blowing it through the outlet channel towards the through hole in the door.

In another implementation variant, the reservoir can comprise a side enclosure enclosing a reservoir space, wherein the side enclosure is connected to an outer surface of the outlet channel, so that the outer surface of the outlet channel further delimits the reservoir space. In other words, the outer surface of the outlet channel, such as a top surface of the outlet channel around the opening in the outlet channel, can form a bottom delimitation of the reservoir space, while the side enclosure delimits the reservoir space in a circumference and in a height direction. This avoids the reservoir being a complete container, e.g., the reservoir does not require its own bottom structure or delimiting bottom surface. This type of reservoir is lightweight and easy to manufacture, since only the bottom edge of the side enclosure has to be mounted to the outlet channel, particularly in a fluid tight manner.

Alternatively, the reservoir can be formed at least from a side enclosure and a bottom plate. The bottom plate may include at least one opening towards the outlet channel, each opening being covered by the closure, particularly the flap. This type of reservoir allows installing an outlet channel having none or almost no top plate. For instance, the outlet channel may have a U-shaped cross-section, the upper open end of which being (completely) covered by the bottom plate of the reservoir. Thus, the outlet channel would also have a closed cross-section, partly formed by the bottom plate of the reservoir.

In yet another implementation variant, the dispersion system can further comprise a further door configured to fit into one of the at least one door opening and comprising a through hole, and a further dispersion unit having a further dispersion channel in fluid communication with the reservoir of the at least two tank modules and the through hole of the further door. Thus, two doors of the vehicle can be used to disperse the medium. For instance, if the doors are arranged on opposite sides of the vehicle, such as opposite sides at the same longitudinal position (in the same cross-sectional plane) of the vehicle, the medium can be spread over a greater area, as the medium leaves the vehicle on both sides of the vehicle.

The further dispersion unit as well as the (first) dispersion unit can be both fluidly connected to the same outlet channel, so that the medium of all reservoirs flows through the (single) outlet channel and is then branched to each of the dispersion units.

According to a second aspect to better understand the present disclosure, a vehicle comprises a dispersion system according to the first aspect or one of its implementation variants.

In an implementation variant, the dispersion system is only temporarily mounted into the vehicle, so that the dispersion system can be removed after employment and the vehicle can be used for other purposes (again).

In another implementation variant, more than one dispersion system can be installed in the vehicle. For instance, if the vehicle has opposite doors, two dispersion systems can be installed side-by-side in the interior space of the vehicle. Each of the dispersion systems can then be employed with one of the opposite doors, i.e., the door of the respective dispersion system is mounted into one of the door openings of the vehicle. Alternatively or additionally, the vehicle may have a plurality of doors at different positions along the longitudinal axis of the vehicle. This plurality of doors may be on the same side of the vehicle and/or on opposite sides of the vehicle. For instance, in case of an aircraft or a train, a plurality of dispersion systems can be installed along the longitudinal axis of the vehicle, so that the amount of medium transportable by the vehicle and dispersed from the vehicle can be significantly increased. Of course, the vehicle may have separate interior spaces on top of each other, each being accessible via a door and door opening. Thus, a plurality of dispersion systems can be installed in each of these interior spaces, in order to disperse a medium through the associated door of the respective interior space.

In a further implementation variant, the vehicle can further comprise a plurality of seat rails configured to receive a mount of a passenger seat. Such seat rails are usually disposed along a longitudinal direction of the vehicle and allow mounting of one or more passenger seats at different positions along the longitudinal direction. The dispersion system, and particularly each tank module, can be configured to be mounted to the plurality of seat rails. Due to the variability provided by the seat rails, the dispersion system can be arranged and mounted in the interior space of the vehicle at a position suitable for the door of the dispersion system to be mounted in the respective door opening of the vehicle.

Depending on the number of tank modules of the dispersion system, a certain number of passenger seats has to be removed from the vehicle. Thus, the reconfiguration of the vehicle from a passenger vehicle to a dispersing vehicle is easily achieved and provides flexibility depending on the dispersion need.

The vehicle can be a passenger aircraft, a cargo aircraft, a heavy helicopter, a bus, a train, a heavy truck or a trailer. In case of a passenger aircraft, such type of vehicle usually comprises a passenger cabin as well as a cargo or freight area arranged below the passenger cabin. This type of vehicle can be equipped with a plurality of dispersion systems in the cargo or freight area as well as in the passenger cabin. The cargo area is usually accessible via a corresponding cargo door. In this case, the cargo door has to be replaced by the door of the dispersion system, so that the door of the dispersion system is to be sized and configured to replace the cargo door.

The present disclosure is not restricted to the aspects and variants in the described form and order. Specifically, the description of aspects and variants is not to be understood as a specific limiting grouping of features. It is to be understood that the present disclosure also covers combinations of the aspects and variants not explicitly described. Thus, each variant or optional feature can be combined with any other aspect, variant, optional feature or even combinations thereof.

BRIEF DESCRIPTION OF THE DRAWINGS

Preferred embodiments of the invention are now explained in greater detail with reference to the enclosed schematic drawings, in which FIG. 1 schematically illustrates a dispersion system for a vehicle, FIG. 2 schematically illustrates a tank module, FIG. 3 schematically illustrates the tank module, where a lid and other components are removed, FIG. 4 schematically illustrates a side view of a closure, FIG. 5 schematically illustrates a cross-section of the closure, FIG. 6 schematically illustrates a perspective view of a closure, FIG. 7 schematically illustrates details of the closure, FIG. 8 schematically illustrates details of the closure, FIG. 9 schematically illustrates a side view of the closure during an opening process, FIG. 10 schematically illustrates a side view of the closure during a closing process, FIG. 11 schematically illustrates a perspective view of a component of a tank module, FIG. 12 schematically illustrates a perspective view of another component of a tank module, FIG. 13 schematically illustrates a perspective view of a further component of a tank module FIG. 14 schematically illustrates a perspective view of an additional component of a tank module, FIG. 15 schematically illustrates a door of the dispersion system, FIG. 16 schematically illustrates a perspective view of a dispersion system at a door region, and FIG. 17 schematically illustrates a vehicle comprising a dispersion system.

DETAILED DESCRIPTION OF THE PREFERRED EMBODIMENTS

Figure 1:
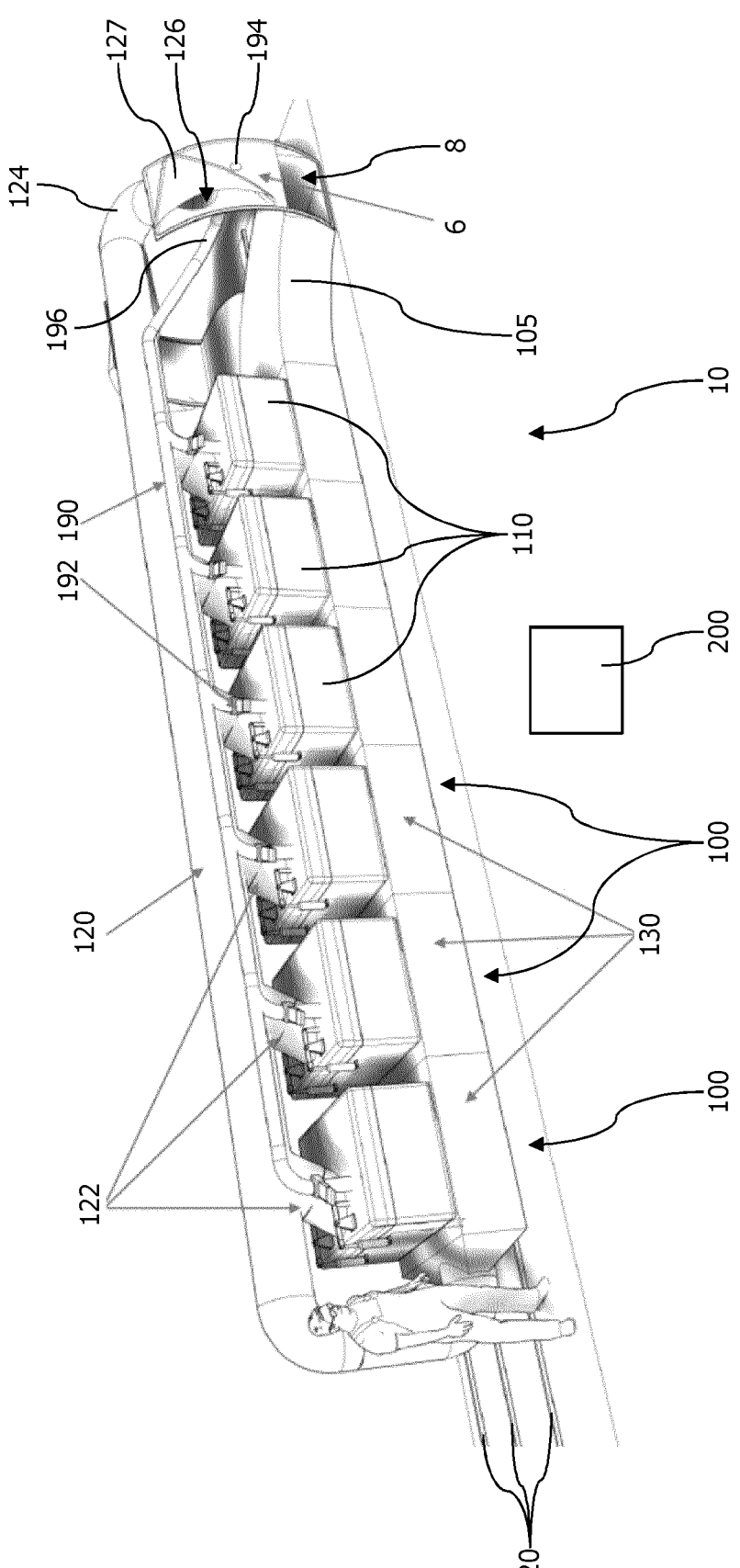

FIG. 1 schematically illustrates a dispersion system 10 for a vehicle 1 (FIG. 17) comprising at least two tank modules 100. FIG. 1 does not show the exterior components of the vehicle for clarity reasons. The illustrated dispersion system 10 includes six tank modules 100 coupled in series to one another. Each tank module 100 has at least a reservoir 110 for storing a medium to be dispersed.

Figure 15:
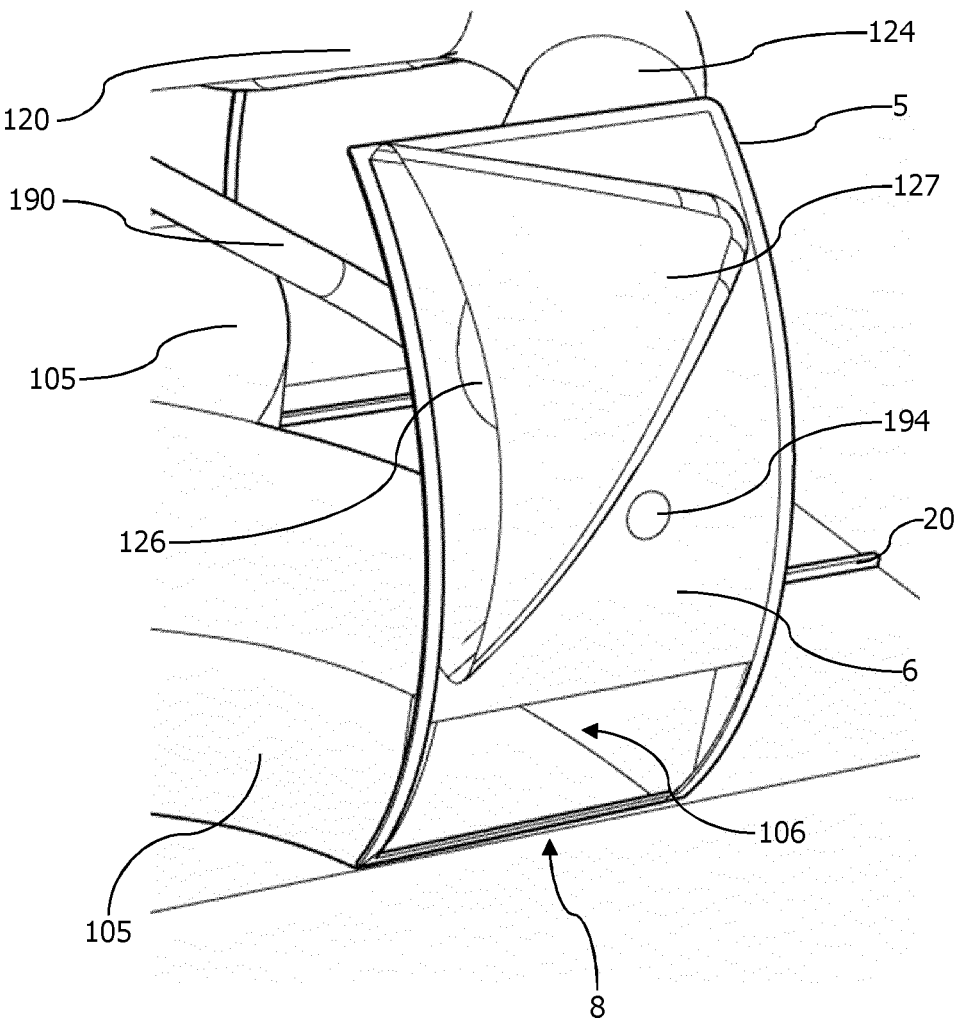
Figure 17:
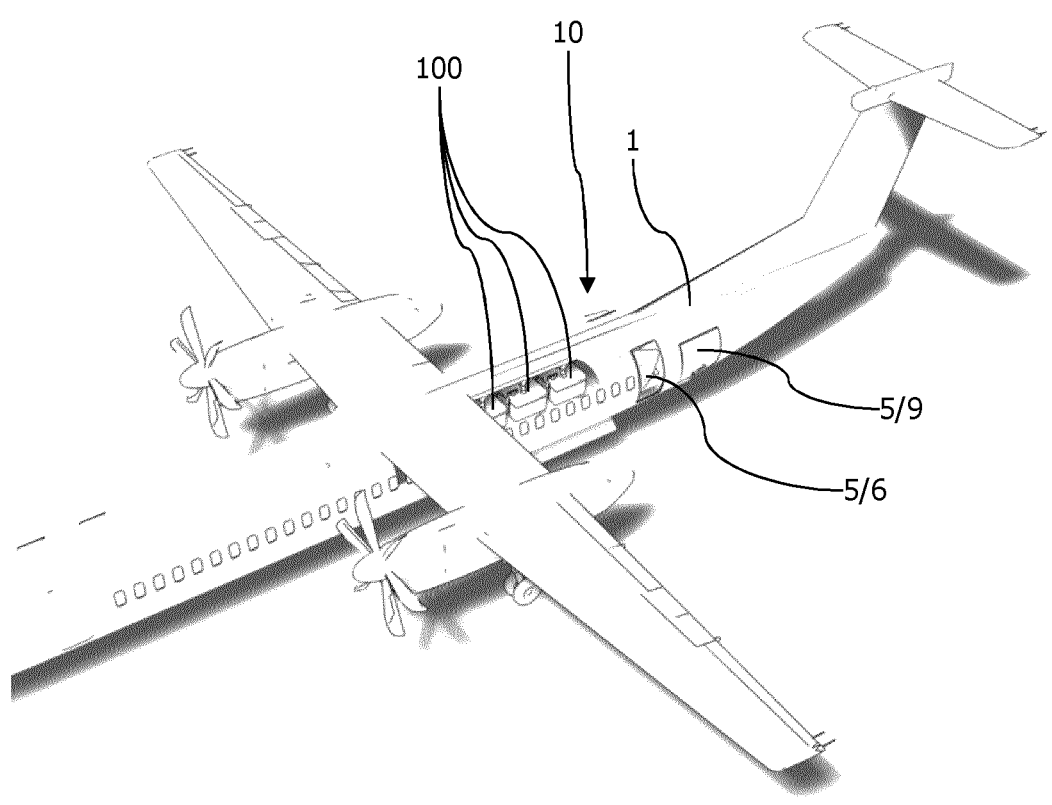

FIG. 1 further illustrates a door 6 configured to fit into a door opening 5 (FIGS. 15 and 17). For instance, the original door of the vehicle (not illustrated) can be removed and replaced by the door 6 of the dispersion system 10. Each tank module 100 is further configured to fit through the door opening 5, which is best achieved before installing the door 6 of the dispersion system 10. The door 6 of the dispersion system 10 comprises a through hole 8, for example at a bottom portion of the door 6.

The dispersion system 10 can further comprise a dispersion unit 105 at, in or close to the door 6. In the illustrated example of FIG. 1, the dispersion unit is implemented in form of a Y-shaped dispersion channel 106, wherein one branch of the dispersion channel 106 is in fluid communication with the through hole 8 of the door 6. The other branch of the Y-shaped dispersion channel 106 can be in fluid communication with a through hole 8 of another door 6 opposite to the door visible in FIG. 1.

The dispersion unit 105 can further comprise baffles, nozzles or the like to disperse the medium in and/or through the through hole 8 or outside of the vehicle 1. For instance, such conventional additional dispersion unit components are usually selected depending on the type of medium to be dispersed, the velocity of the vehicle 1 during dispersion and the like.

The dispersion unit 105, particularly the dispersion channel 106 is further in fluid communication with the reservoir 110 of each tank module 100. This allows a flow of the medium stored in the reservoir 110 to the dispersion unit 105 and through the through hole 8. For instance, each tank module 100 can comprise an outlet channel 130 being in fluid communication with the dispersion channel 106. The outlet channel 130 can form a bottom portion of the tank module 100, and the reservoir 110 is mounted on top of the outlet channel 130. This allows flow of the medium from the reservoir 110 into the outlet channel 130 by gravity.

The outlet channels 130 of each tank module 100 can be connected to one another in a fluid tight manner. Thus, the outlet channel 130 of each tank module 100 forms a portion of a continuous outlet channel, once all tank modules 100 are connected to one another. This connection may be achieved solely by connecting the outlet channels 130 of the respective tank modules 100 to one another. Thus, a continuous outlet channel 130 is formed by all tank modules 100 which is connected to the dispersion unit 105 at one end, i.e., at one end of the tank module 100 being directly adjacent to the dispersion unit 105.

The dispersion system 10 further comprises a supply line 190 configured to provide the medium into each reservoir 110 for filling the reservoir(s) 110. For example, the supply line 190 may fluidly connect a fill nozzle 194 arranged at the door 6 or a similar position at the vehicle 1 or a filler pipe 196, which can be connected to another medium supply, such as a tank or filling system. Each tank module 100 may be connected to the supply line 190 via a respective branch. Such branch can further include a supply valve 192 configured to be connected to the supply line 190 and closing and opening the fluid connection between the supply line 190 and the reservoir 110. This allows filling each reservoir 110 of the tank modules 100 individually. For example, the reservoirs 110 can be filled simultaneously or one after the other, depending on a weight balance of the vehicle during the filling process.

FIG. 1 further illustrates a ram air channel 120 connecting a ram air source 124 with the outlet channel 130 and/or each reservoir 110 of the at least two tank modules 100. The ram air source 124 can be any ram air channel already present in the vehicle 1 or can be a dedicated ram air source 124 forming part of the dispersion system 10 to be installed in the vehicle. For example, the door 6 of the dispersion system 10 can comprise a ram air inlet 126 and/or a ram air scoop 127, which together form one example of a ram air source 124. Such configuration of the door 6 allows provision of a dedicated ram air source 124 for any vehicle 1, i.e. independent of whether the vehicle 1 already includes a ram air source 124 or not.

The ram air source 124 can also be formed by two ram air inlets 126 and/or two ram air scoops 127, for example arranged opposite to one another on opposite sides of the vehicle 1. FIG. 1 illustrates only a small portion of a second ram air scoop 127 opposite of the ram air scoop 127 clearly illustrated in FIG. 1.

Furthermore, the ram air source 124 is configured to collect ambient air from an environment outside of the vehicle and/or guide the ambient air into the ram air channel 120. Each tank module 100 can comprise a ram air valve 122 configured to regulate a volume flow of ram air from the ram air channel 120 into the respective reservoir 110. For instance, as with the supply line 190, the ram air channel 120 can have a plurality of branches, one for each tank module 100. These branches can include the ram air valve 122 for each reservoir 110.

As illustrated in FIG. 1 the ram air channel 120 is in fluid connection with the outlet channel 130. Particularly, the ram air channel 120 is fluidly connected to the beginning of the outlet channel 130 of the tank module 100 being furthest away from the dispersion unit 105. Thus, ram air guided into the outlet channel 130 can be used to convey or blowout medium entered into the outlet channel from any of the reservoirs 110 through the dispersion channel 106 and the through hole 8 in the door 6.

The dispersion system 10 can further comprise a controller 200 configured to individually open a closure 140 of each tank module 100. Such closure 140, which will be explained in more detail with respect to FIGS. 2 to 10, is configured to close the reservoir 110 of the respective tank module 100 with respect to the outlet channel of the tank module 100 in a fluid tight manner. Thus, the controller 200 can control release of the medium stored in a reservoir 110 of any of the tank modules 100 into the outlet channel 130 individually. This includes releasing the medium of one reservoir 110 after the other, releasing the medium of a predefined number of reservoirs 110 or releasing the medium of all reservoirs 110 at once.

Furthermore, the controller 200 is further configured to control any valve of the dispersion system 10, such as the supply valve 192 during filling the reservoir 110 (refueling procedure) and/or the ram air valve 122.

Figure 2:
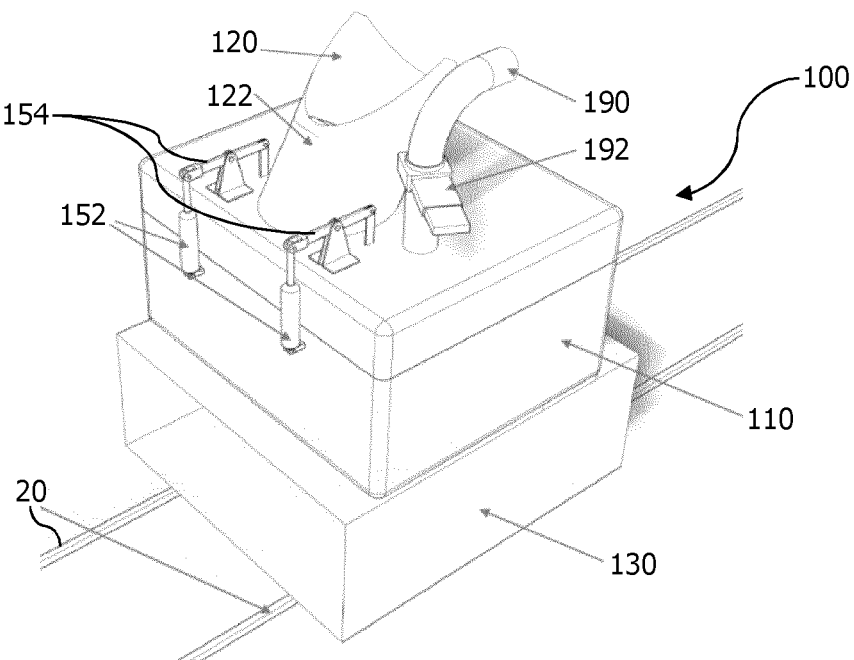

FIG. 2 schematically illustrates a tank module 100 in more detail. Specifically, the tank module 100 comprises the reservoir 110 and (a portion of) the outlet channel 130. The outlet channel 130, and hence the tank module 100, can be mounted to a seat rail 20 that can be present in a floor of the vehicle 1. Such seat rails 20 may usually be installed in the vehicle 1 to mount a plurality of passenger seats along a longitudinal direction of the seat rails 20, preferably at variable positions. Instead of seat rails 20, cargo load holding or connecting points may be present in the vehicle 1, which can also be used to mount the tank module 100 to the vehicle 1 and/or the vehicle floor.

On top of the reservoir 110 is the supply line 190 entering the reservoir 110 for filling the reservoir 110 with the medium to be dispersed. This filling can be controlled via the supply valve 192, such as the illustrated slide valve 192. The medium can be a liquid as well as a powdery or granular medium. Furthermore, on top of the reservoir 110 is arranged one end or branch of the ram air channel 120 and an associated ram air valve 122. The ram air valve 122 can likewise be a slide valve or can be a flap valve.

In addition, the tank module 100 can comprise a raising device 150 (FIG. 3), of which only two actuators 152 and two rocker 154 (or rocker arms) are visible in FIG. 2. Specifically, the reservoir 110 is closed by a lid as illustrated in FIG. 2, which avoids spilling of the medium in the reservoir 110 and closes the reservoir 110 at its upper side in a fluid tight manner.

Figure 3:
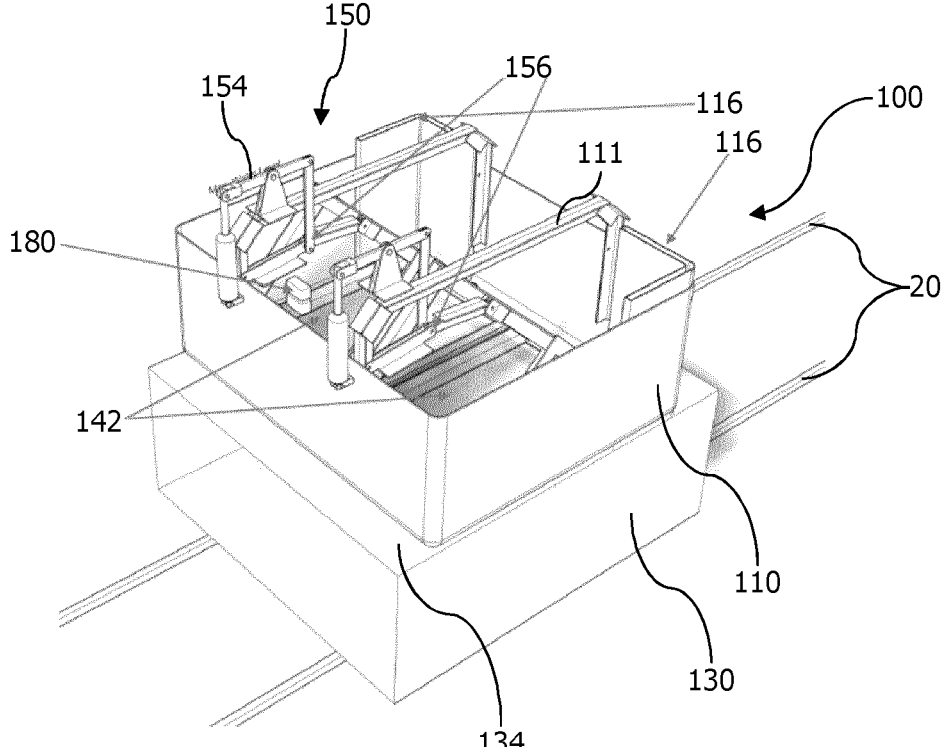

FIG. 3 schematically illustrates the tank module of FIG. 2, where the lid, the ram air channel 120 and the supply line 190 are removed. FIG. 3 illustrates further structural components of the raising device 150 as well as the closure 140. Particularly, the closure 140 can comprise an elastic flap 142 which covers an opening 132 (FIGS. 9 to 12) in the outlet channel 130. Actually, FIG. 3 illustrates two closures 140 arranged next to each other and which include the same components. Each closure 140, and particularly the respective elastic flap 142, can be raised by the raising device 150 from a closed position to an open position. FIG. 3 illustrates the closure 140 (the flap 142) in a closed position, where the reservoir 110 is fluidly separated from the outlet channel 130.

The raising device 150 can further comprise a toggle lever 156 mechanically connected to rocker 154. Once the actuator 152 moves (upward or downward in FIGS. 2 and 3), the toggle lever 156 is moved at its hinged center part via the rocker 154, which will be explained in more detail with respect to FIGS. 4 and 6.

The hinged center part of the toggle lever 156 does not necessarily form the geometric center of the toggle lever 156. Rather, the hinge in the middle part of the toggle lever 156 may be arranged asymmetrically. This can be used to create a predefined lever arm and, hence, momentum (torque) induced by the rocker 154 and acting on the raising device 150.

Moreover, the center part of the toggle lever 156 may be arranged (slightly) above the hinged ends of the toggle lever 156 (to the left and right in FIG. 4), when the raising device 150 is in the closed position. This helps holding the raising device 150 in the closed position, without the necessity of a continuous force acting on the toggle lever 156, for example, from the rocker 154 or actuator 152. Thus, the raising device 150 can be mechanically kept in the closed position.

Figure 4:
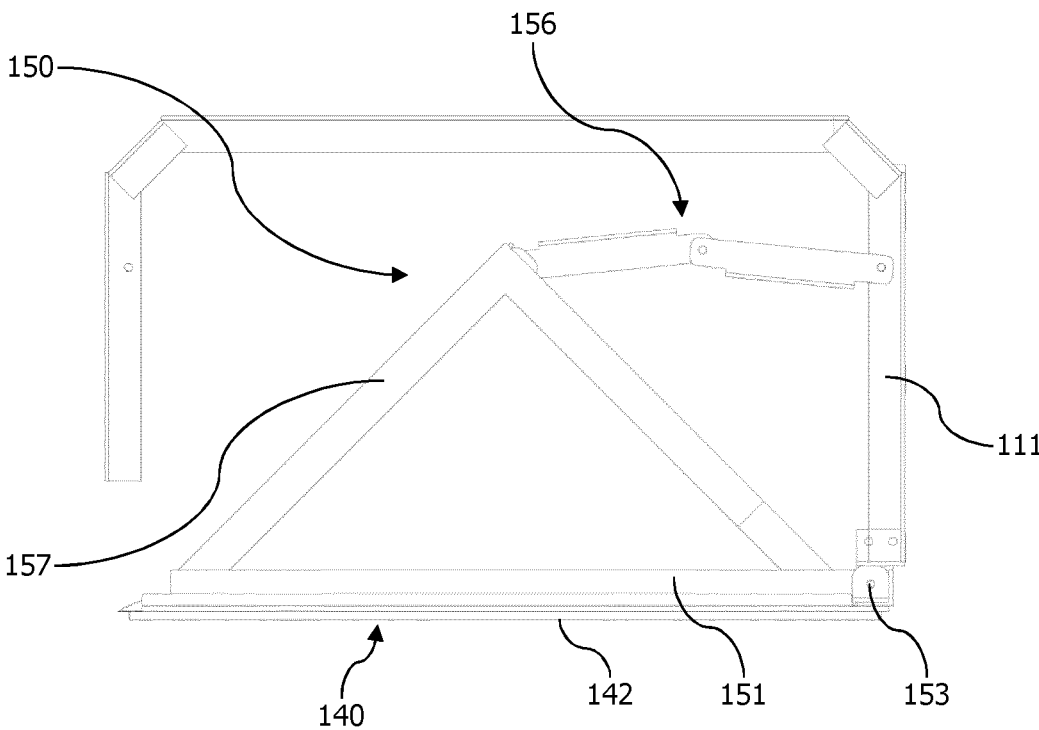

When opening the raising device 150, moving it upwards in FIG. 4, the toggle lever 156 is lowered, particularly at its center part. This pulls the upper portion of the raising device 150 towards the right portion (in FIG. 4) of the fixed frame 111, so that the raising device 150 pivots around hinge or joint 153.

FIG. 3 further illustrates a level drain 116 which fluidly connects the reservoir 110 with the outlet channel 130. This avoids overfilling the reservoir 110. Furthermore, the tank module 100 can further be equipped with a sensor or floating gauge 180. This sensor or floating gauge 180 can be coupled to the controller 200, so that the controller 200 can close the supply valve 192, once the reservoir 110 is filled to its maximum level.

Figure 5:
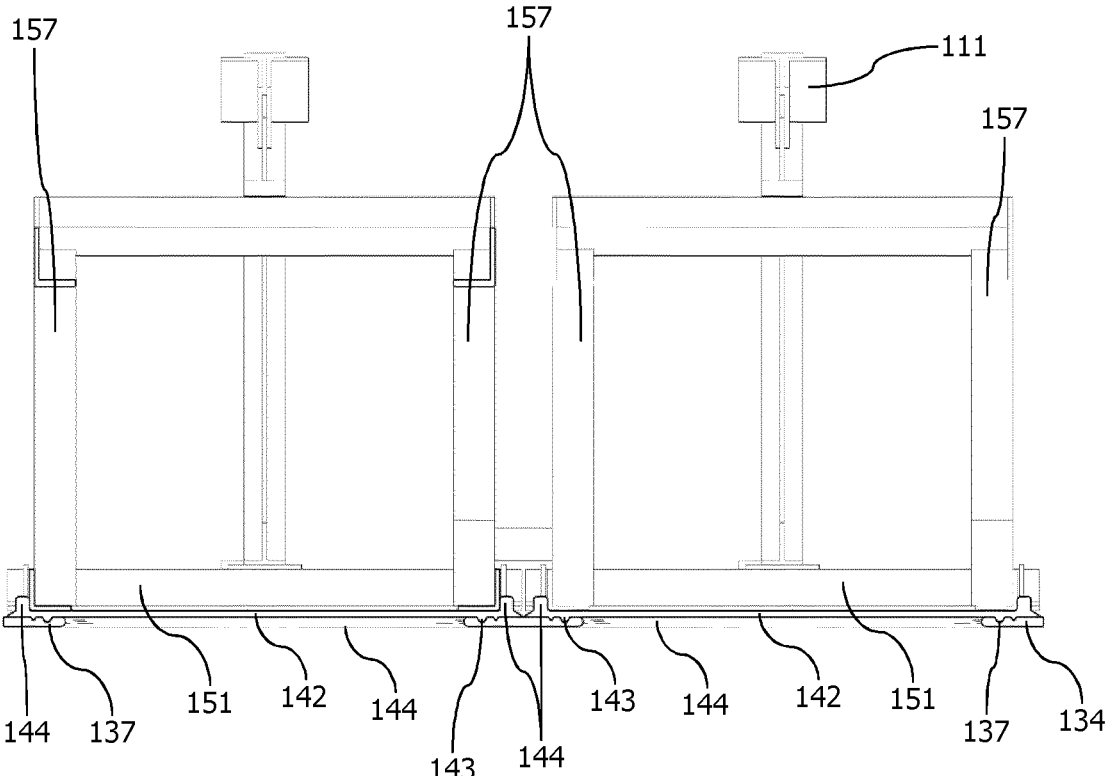
Figure 6:
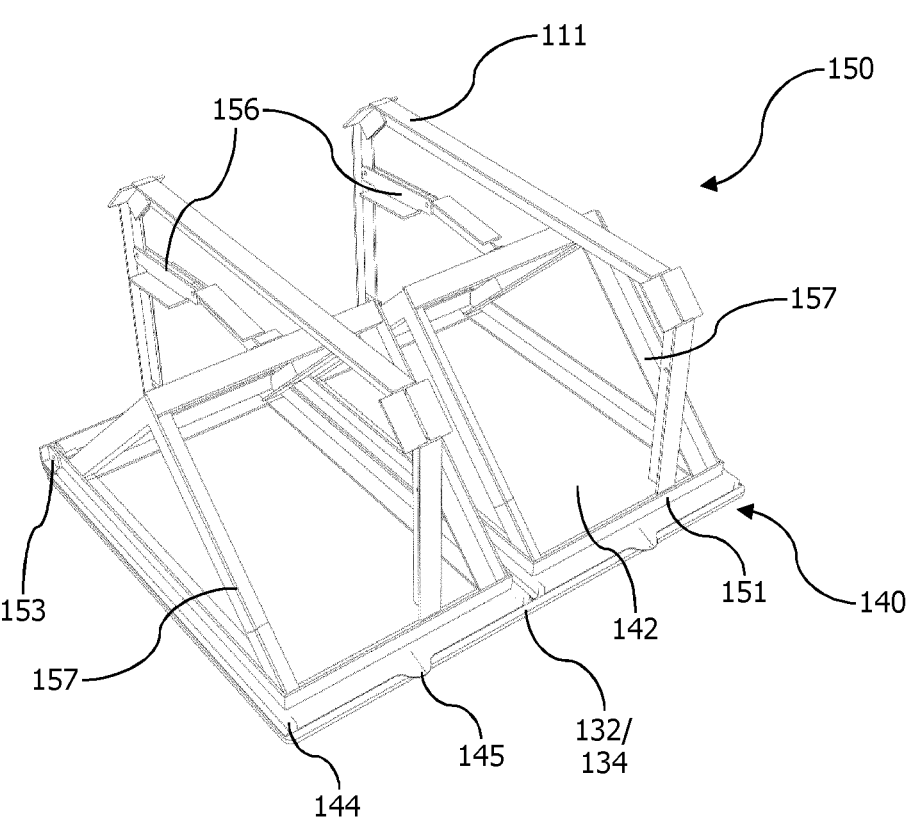

FIGS. 4 and 5 schematically illustrate a side view and a cross-section of a pair of raising devices 150 with closure 140, respectively, the side view and cross-section being perpendicular to one another, but without illustrating the rocker 154 and actuator 152. FIG. 6 schematically illustrates a perspective view of the pair of raising devices 150 and closures 140. The pair of raising devices 150 and closures 140 can be installed in one reservoir 110 of one tank module 100.

The toggle lever 156 is hinged to a fixed frame 111, which can also be employed for mounting the reservoir 110 and its lid (see FIGS. 2 and 3). On the opposite end of the toggle lever 156, a raising frame 157 is pivotally connected. The rocker 154 is connected to the toggle lever 156 at the center joint of the toggle lever 156. The raising frame 157 is further hinged to a fixed structure, such as frame 111, at joint 153. The raising device 150 may further comprise a closure frame 151. The closure frame 151 may be pivotally connected to the fixed structure 111 at joint 153 instead of or additionally to the raising frame 157.

FIGS. 4 to 6 illustrate a pair of raising devices 150 and closure 140 in a closed position, where the closure frame 151 is parallel to a top wall of the outlet channel 130, at a position where the opening 132 into the outlet channel 130 is provided. The closure frame 151, hence, is right above or even in the opening 132.

The closure 140 is also arranged at the opening 132 into the outlet channel 130. Specifically, an elastic flap 142 of the closure 140 covers the opening 132 and closes the opening 132 in a fluid tight manner. The medium stored in the reservoir 110 at least partially lies on top of the flap 142. Since the flap 142 is elastic, the closure frame 151 stabilizes the flap 142 and holds it over the opening 132. For instance, as is derivable from FIG. 5 (showing a cross-section of the raising device 150 and closure 140), the closure frame 151 and/or raising frame 157 can be disposed above a top surface 134 of the outlet channel 130, particularly the top surface 134 of the outlet channel 130 at the circumference of the opening 132 in the outlet channel 130. Thus, the raising device 150 can hold the flap 142 against the top surface 134 of the outlet channel 130. This stabilizes the elastic flap 142 and further facilitate sealing of the opening 132 by the flap 142.

In addition, the flap 142 may comprise at least one ridge 144 on a top surface or bottom surface of the flap 142. The at least one ridge 144 may form a circumferential ridge 144 arranged at or close to all outer circumferential edges (and outer rim) of the flap 142. Such ridge 144 may be arranged on the top surface of the flap 142 and adjacent to the closure frame 151, so that the corner formed by the ridge 144 and flap 142 snuggles around a corner of the closure frame 151. This increases stability of the elastic flap 142 in the closed position. In addition, the ridge 144 hinders the flap 142 from moving underneath the closure frame 151, so that the flap 142 cannot bulge and move into the opening 132. The closure frame 151 lowered to the closed position illustrated in FIG. 5 can also force flap 142 in the right position closing the opening 132 in a fluid tight manner. Likewise, a ridge 144 on the bottom surface of the flap 142 may contact the circumference of the opening 132, which also stabilizes the elastic flap 142 in the closed position.

A further optional sealing feature can be one or more sealing lips 143 arranged at the flap 142. The top surface 134 of the outlet channel 130 may comprise corresponding grooves 137 into which such lip 143 can lie when the flap 142 is in the closed position.

Figure 7:
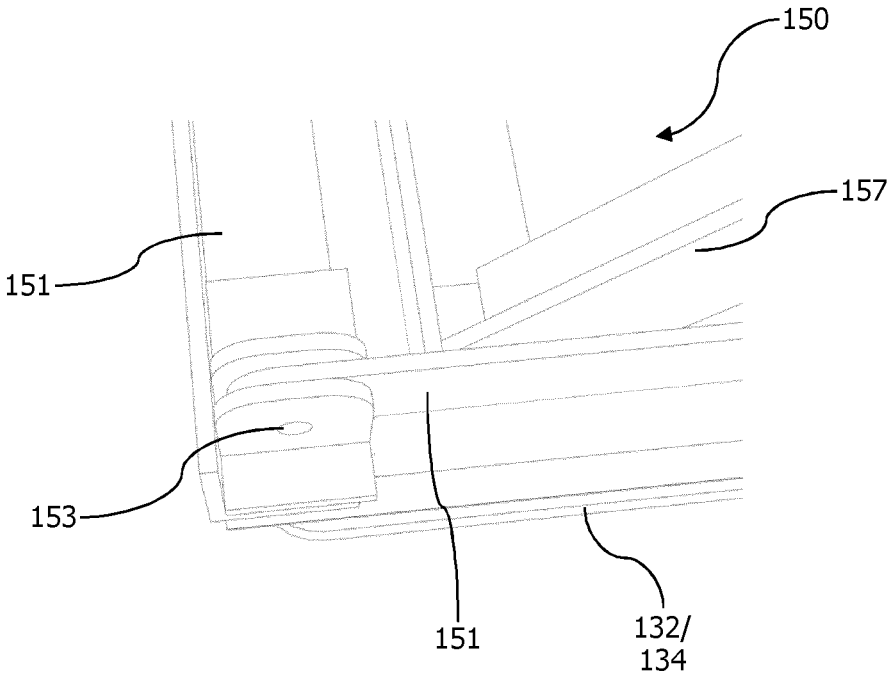

FIG. 7 schematically illustrates the hinge or joint 153 of the raising device 150. FIG. 7 also illustrates the raising device 150 in the closed position, where it lies close to the opening 132 and/or top surface 134 of the outlet channel 130. The elastic flap 142 is not illustrated in FIG. 7 for clarity reasons.

Figure 8:
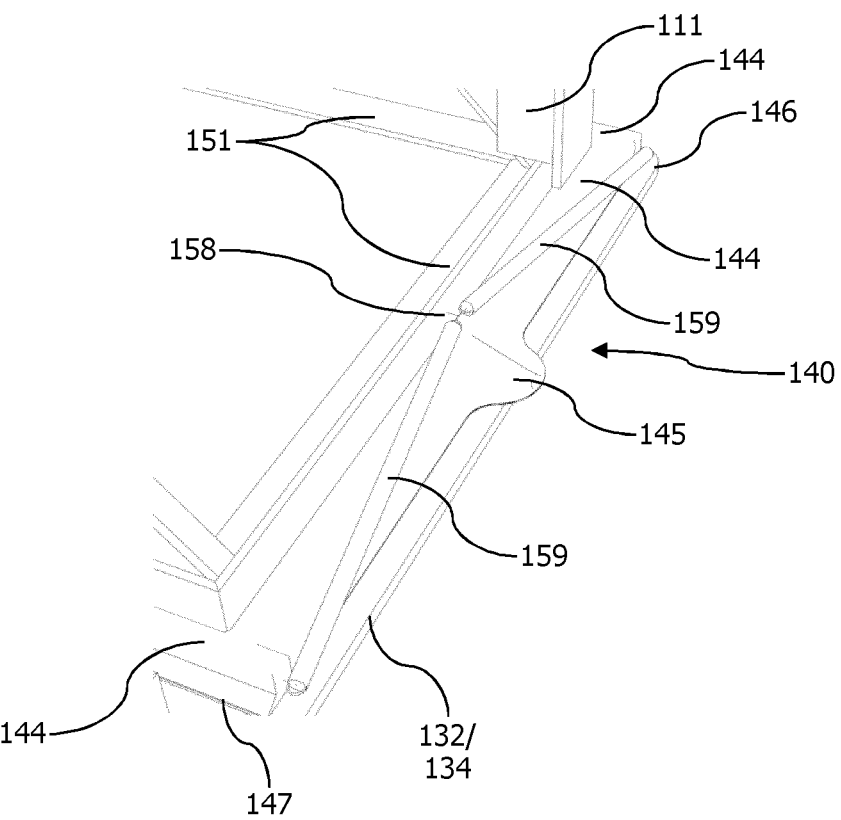

FIG. 8 illustrates further details of the closure 140. Specifically, the elastic flap 142 is shown in the closed position and held by the closure frame 151 together with the top ridge 144. FIG. 8 only partially shows the ridge 144 arranged on the upper surface of the flap 142, since the one or more springs 159 mask the circumferential ridge 144. It is to be understood that the circumferential ridge 144 contacts the closure frame 151 along the outer circumference of the closure frame 151.

Figure 9:
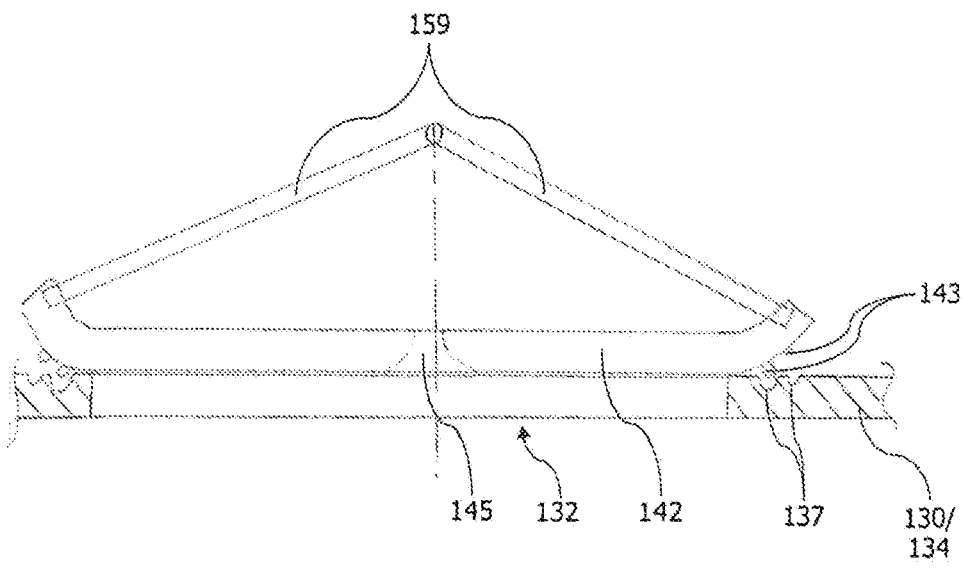
Figure 10:
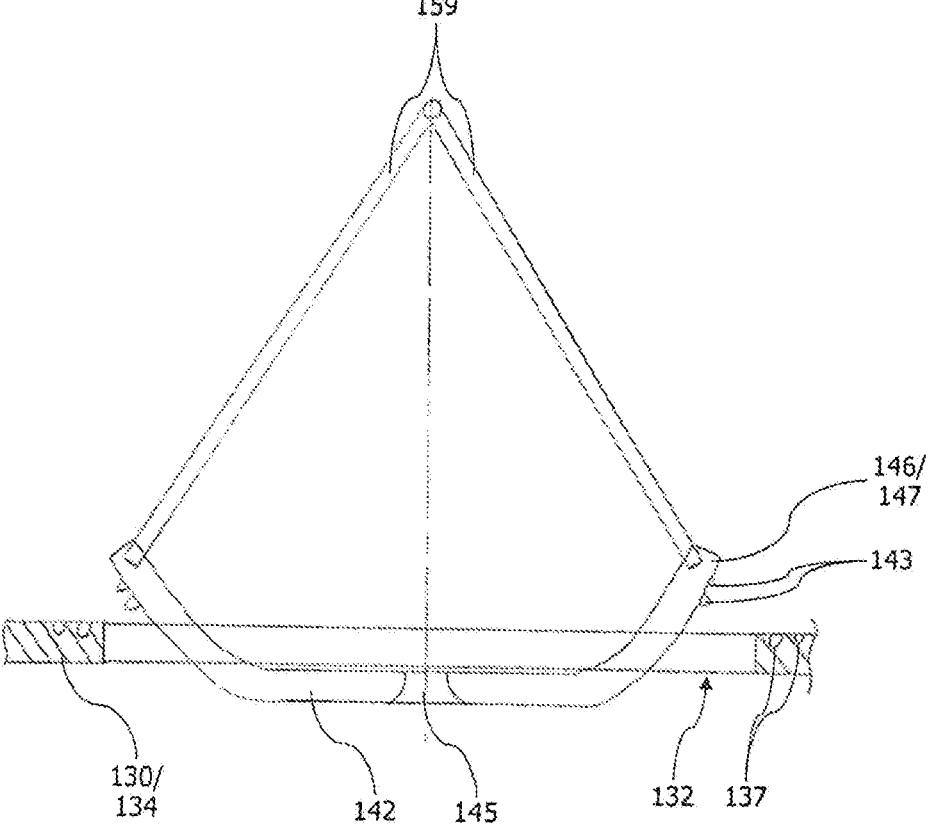

Furthermore, the opening and closing procedures of the closure 140 are now described with respect to FIGS. 8 to 10 and with further reference to FIGS. 4 to 6. Specifically, the closure 140 further comprises one or more springs 159, which couples the raising device 150 to the flap 142. Particularly, one end of the spring 159 is connected to a corner 146 and/or edge 147 of the flap 142, and the other end of the spring 159 is connected to the closure frame 151 at a corresponding connecting position 158. For instance, the spring 159 can be connected to a front portion of the closure frame 151, i.e., a part of the closure frame 151 opposite to hinge 153. The one or more springs 159 can be connected or coupled to the closure frame 151 at a center position 158 of the front portion. It is to be understood that each spring 159 can be coupled to the closure frame 151 at a respective position (not illustrated). This respective coupling positions at the closure frame 151 may be close to the corresponding corner of the closure frame 151, or alternatively may be located, so that the springs 159 cross themselves. In any case, the coupling position 158 of spring 159 at closure frame 151 can be chosen, in order to facilitate lifting the corner 146 and bulging the flap 142.

When the actuator 152 moves the rocker 154 and toggle lever 156 (particularly when the center joint of toggle lever 156 is pushed downwards), the raising frame 157 and closure frame 151 will pivot around joint 153. This will lift the opposite side (front end) of the closure frame 151 (see left end in FIG. 4 and front end in FIG. 6). At this lifted-up end of the closure frame 151 there are arranged the springs 159 (FIG. 8).

With references to FIG. 9, the lifting of the closure frame 151 and, hence, the springs 159 will lift the corners 146 and/or edges 147 of the flap 142. For instance, the sealing lips 143 may be removed from the grooves 137 in the top surface 134 of the outlet channel 130. While the flap 142 may still contact a circumference (rim) of the opening 132 in the outlet channel 130 and, hence, seals the opening 132, the flap starts bulging when the closure 140 moves from the closed position towards the open position. During the opening movement of the raising device 150, the closure frame 151 moves away from the flap 142 and, particularly, from the ridge(s) 144, so that the flap 142 is not stabilized by the closure frame 151 anymore and can slip underneath of the closure frame 151.

When the raising device 150 and/or the closure 140 moves further to the open position (i.e., away from the opening 132), the flap 142 will bulge more and more due to its elasticity and the lifted corners 146. In this bulged form of the flap 142, particularly the bulged front edge of the flap 142 (opposite to the joint 153), the flap 142 is curved to such an extent that it will move through the opening 132 into the outlet channel 130. In this position, the medium lying with its weight on the elastic flap 142 will push the elastic flap 142 through the opening 132 into the outlet channel 130 and gives way for the medium to flow into the outlet channel 130. This flush of medium into the outlet channel 130 can happen very fast, due to the elasticity of the flap 142 and the lack of stabilization by the lifted closure frame 151. The elasticity of the springs 159 allow the front edge of the flap 142 between both corners 146 to move into the outlet channel 130.

Instead of springs 159, a corresponding rope or string can be employed, which can have a length allowing the flap 142 to reach a position in the outlet channel 130. Thus, when the rope or string is pulled tight, the flap 142 has reached its maximum open position, i.e., being arranged in the outlet channel 130.

In order to shorten the time that the medium requires to flow into the outlet channel 130, the ram air valve 122 of the associated tank module 100 can be opened, so that ram air presses the medium from the reservoir 110 into the outlet channel 130. This increased pressure induced by the ram air also facilitate pushing the flap 142 into the outlet channel. In order to facilitate flow out of the medium through the outlet channel towards the dispersion unit 105, the front edge of the flap 142 entering the outlet channel 130 first shall be arranged in such a manner that it faces towards the dispersion unit 105.

The raising device 150, such as the raising frame 157, can be mechanically coupled to the ram air valve 122. Thus, if the raising device 150 is lifted to the open position, the ram air valve is automatically opened via the mechanical coupling of both components. Alternatively or additionally, the controller 200 can open the air valve 122 via a valve motor or the like.

Once the medium has been flushed into the outlet channel 130, the weight of the medium does not press the flap 142 downwards into the outlet channel 130. Thus, the springs 159 can pull the flap 142 back affords and eventually through the opening and out of the outlet channel 130 again. Alternatively or additionally, the raising device 150 in can be lifted (raised) even further, i.e., beyond the open position. This will pull the springs 159 or the rope or string of upwards and, hence, lifts the flap 142 back through the opening 132 into the reservoir 110.

FIG. 10 illustrates a raised position of the raising device 150 pulling on the springs 159 or ropes or strings. At this time, a projection 145 of the flap 142 contacts a bottom side of the top wall 134 of the outlet channel 130. The projection 145 initially hinders the front edge of the flap 142 from moving through the opening 132. This allows unhindered movement of the corners 147 of the flap 142 through the opening 132, since the flap 142 is in the corresponding bulged shape. A further movement of the raising device 150 will pull the projection 145 through the opening 132, since the projection 145 is also made from the same elastic material as the remainder of the flap 142.

FIG. 10, hence, shows a third position of the raising device 150, being above the open position. Thus, the raising device 150 can achieve a closed position being close to or above the opening 132 in the outlet channel 130, a lifted open position, where the flap 142 is freed and can move through the opening 132, and a further lifted position, where the flap 142 is pulled back through the opening into the reservoir 110.

Once the flap 142 is above the top wall 134 of the outlet channel 130, i.e., back inside of the reservoir 110, the raising device 150 can be lowered back to the closed position. When lowering the raising device 150, and particularly the closure frame 151 until the closure frame 151 lies on the flap 142, the opening 132 can be closed and sealed by the flap 142 again and the reservoir 110 is ready to be filled again.

At this time, the medium is in the outlet channel 130 and may flow towards the dispersion unit 105. This flow of medium in the outlet channel 130 can be due to gravity. In addition, ram air from ram air channel 120 may be guided into the outlet channel 130 (see fluid connection of ram air channel 120 with outlet channel 130 in FIG. 1). Thus, the medium flushed into the outlet channel 130 can be blown out of the vehicle 1 with the aid of ram air, i.e. without any additional conveying components.

Figure 11:
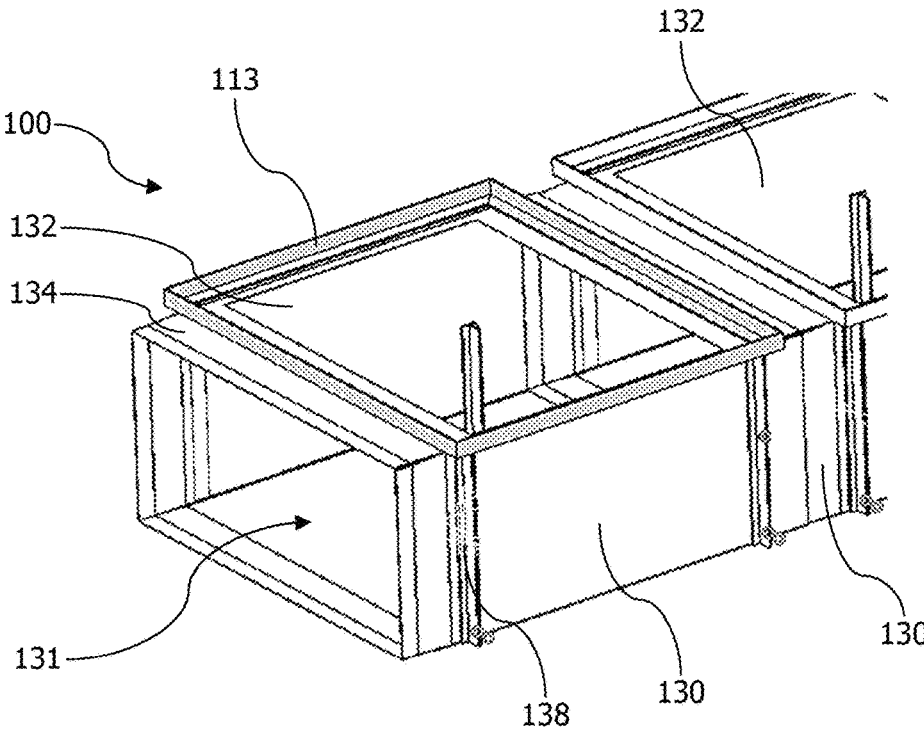

FIGS. 11 to 14 schematically illustrate perspective views of certain components of a tank module 100. Specifically, FIG. 11 illustrates only the outlet channel 130, i.e. one complete and one cut-off segment of the outlet channel 130 of adjacent tank modules 100. The outlet channel 130 as an interior space 131, which allows flowing a medium and/or a stream of air therethrough. A simple construction of the outlet channel 130 is a rectangular frame as illustrated in FIG. 11.

On the top surface 134 of the outlet channel 130 can be arranged a frame 113, which delimits a circumference of the reservoir 110 (not illustrated in FIG. 11). Inside of the frame 113 is the opening 132, which allows fluid connection between the reservoir 110 and the interior space 131 of the outlet channel 130. The frame 113 together with columns 138 provide static stability of the reservoir 110 and, hence, the tank module 100. Specifically, the frame 113 and columns 138 can carry the load of the medium when filled into the reservoir 110.

Figure 12:
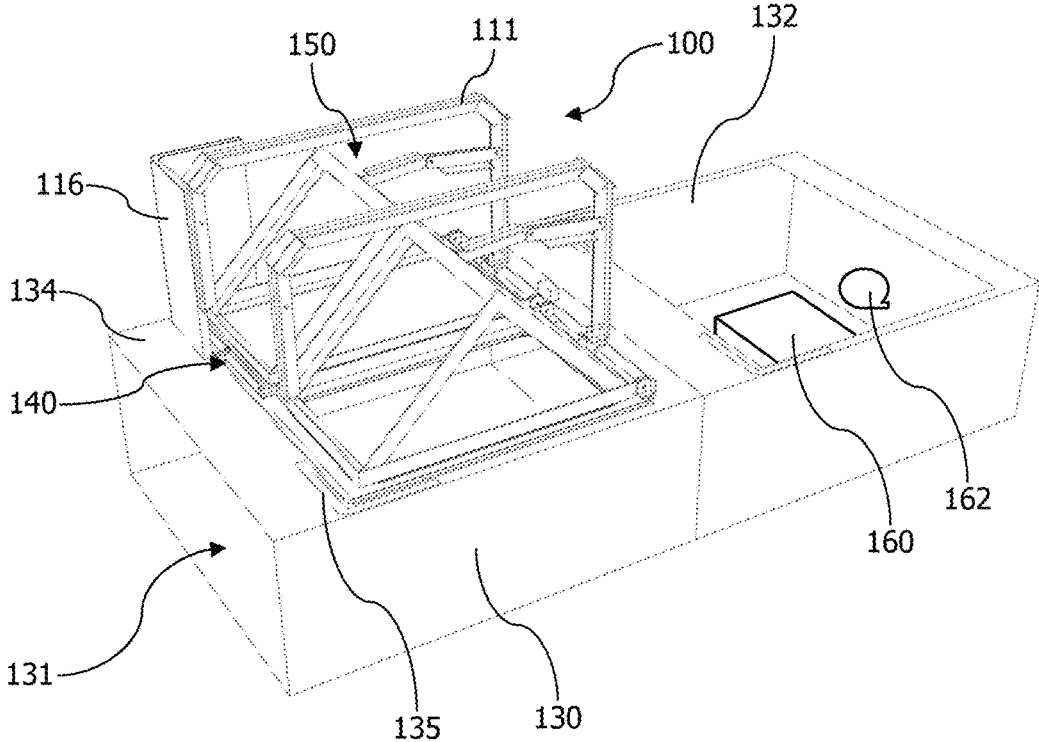

As illustrated in FIG. 12, a raising device 150 as well as a fixed frame 111 can be provided on top of the opening 132. Actually, a pair of raising devices 150 and a pair of fixed frames 111 are installed. Alternatively, a single closure 140, and particularly a single flap 142, can also be installed, but are not illustrated in FIG. 12.

Optionally, a level drain 116 can be mounted on the top surface 134 of the outlet channel 130. For instance, a corresponding opening 135 in the top surface 134 of the outlet channel 130 provides a fluid connection into the interior space 131 of the outlet channel 130. The level drain 116 can be hollow or any other tubular form allowing the medium to flow through the level drain 116 and the over spill opening 135 into the interior space 131 of the outlet channel 130. The level drain 116 and corresponding opening 135 are illustrated in FIG. 12 is arranged at the corners of the frame 113 and the opening 132. It is to be understood that the level drain 116 and opening 135 may have any desired shape and may also be arranged, for example, between the pair of closures 140 or any other position. The arrangement of level drain 116 and opening 135 at the corners allows maximization of the size of the flaps 142 and opening 132.

FIG. 12 further illustrates as one example only, a storage space 160 for a powdery and/or granular agent. Such storage space 160 can be, for example, installed in the outlet channel 130. This allows blowing the powdery and/or granular agent through the outlet channel 130 towards the dispersion unit 105 by ram air fed into the outlet channel 130 from the ram air channel 120 (See FIG. 1). Optionally, a conveyor 162 configured to convey the powdery and/or granular agent towards the dispersion unit 105 can also be provided in the tank module 100. FIG. 12 illustrates such conveyor 162 as being installed in the outlet channel 130. Alternatively, the conveyor 162 can be arranged in the ram air channel 120 or a similar position outside of the tank modules 100. Although the conveyor 162 is illustrated as a blower or fan, it is to be understood that the conveyor 162 can also be a spiral conveyor, a belt or a clapper or the like.

Alternatively or additionally, the storage space 160 and/or the conveyor 162 can also be installed outside of the outlet channel 130, for example, on a side thereof, on top of the top surface 134, or even in the reservoir 110.

Figure 13:
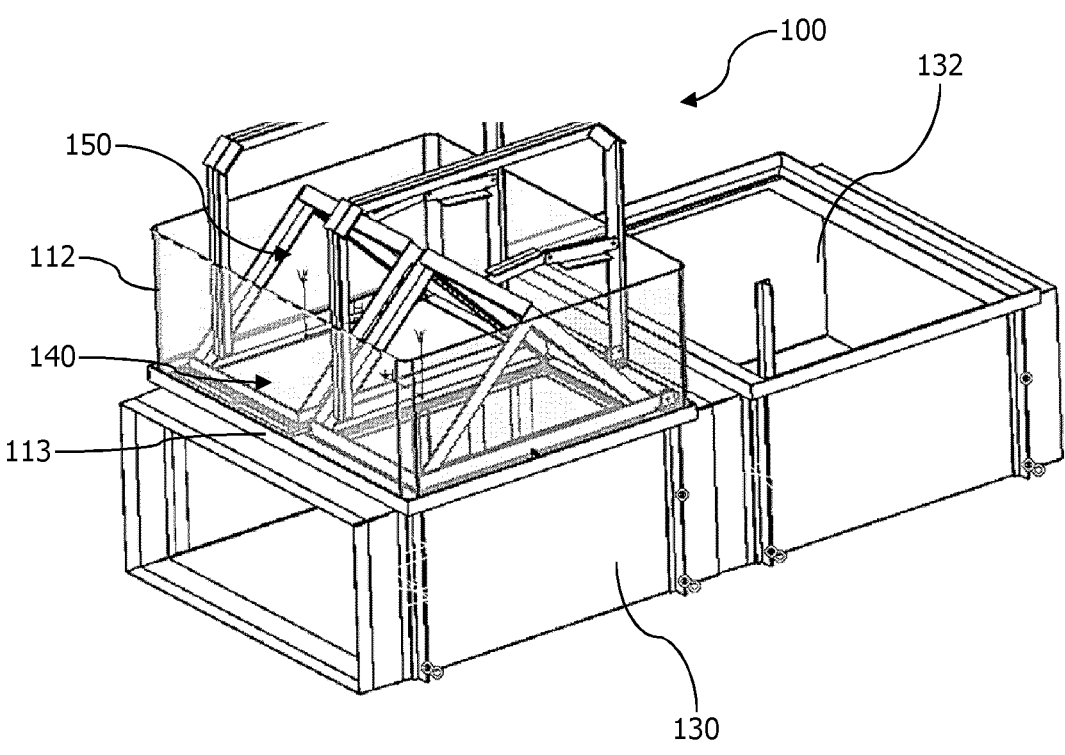

As illustrated in FIG. 13, the reservoir 110 can comprise a side enclosure 112 enclosing the reservoir space. The side enclosure 112 can be connected to an outer surface of the outlet channel 130, for example, via or at the frame 113. Thus, the side enclosure 112 as well as the enclosed top surface 134 of the outlet channel 130 delimit the reservoir space.

Figure 14:
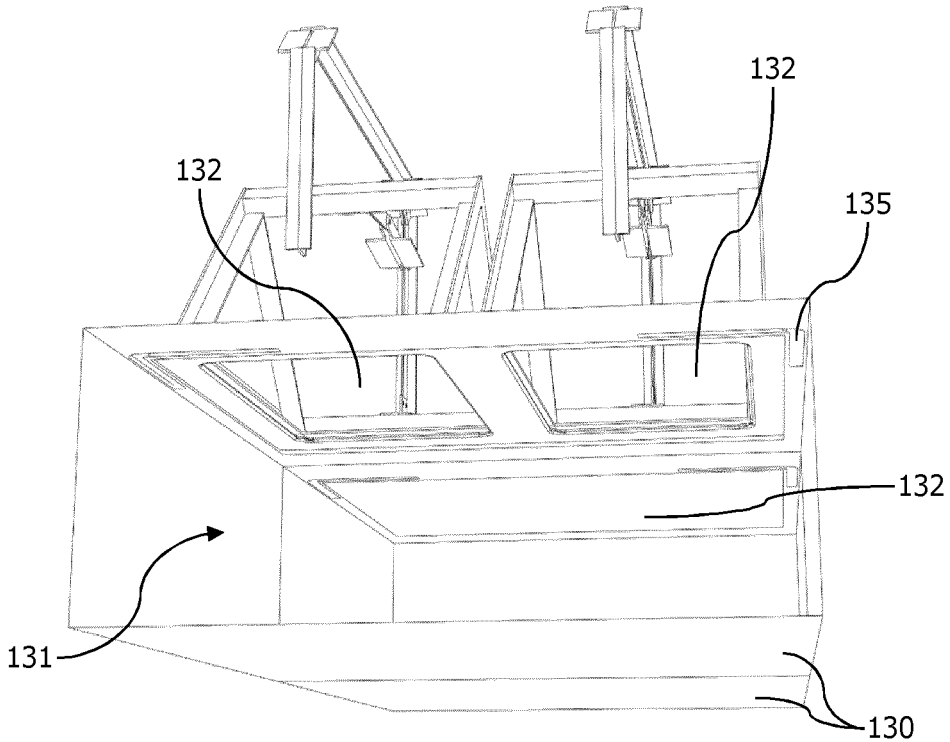

FIG. 14 further illustrates a perspective view into the outlet channel 130. The opening 132 in the top surface 134 of the outlet channel 130 may be one large opening, or may be further divided into a pair of openings 132, one for each closure 140. A respective flap 142 of each closure 140 can then close and seal one of the pair of openings 132. Alternatively, one large flap 142 may cover the large opening as illustrated in FIG. 14 at the rear outlet channel 130 (of the rear tank module 100).

A further possibility of constructing the outlet channel 130 and the reservoir 110 can be achieved by providing the outlet channel with a large opening 132, such as the large opening 132 visible in FIG. 14 at the rear outlet channel 130. Actually, the outlet channel 130 may not have any top wall 134 but can have a U-shaped cross-section instead. The reservoir 110 can then comprise a bottom portion or bottom plate having two openings 132, as illustrated in the front reservoir 110 of FIG. 14. This reservoir 110 can then be placed on top of the outlet channel 130, either on top of the large opening in the outlet channel 130 or on top of the open part of the U-shaped outlet channel 130.

FIG. 15 schematically illustrates a door 6 of the dispersion system 10 from an outside of the vehicle 1, i.e., an exterior side of the door 6. The door 6 includes a through hole 8 providing a fluid connection between the dispersion channel 106 and the ambient (exterior) of the vehicle 1. The door 6 can further comprise a fill nozzle 194, to which a filler pipe 196 (not visible in FIG. 15) is connected on the inside of the door 6. A supply line 190 may then be connected to the filler pipe 196 or may form the filler pipe 196.

In addition, a ram air source 124 can be provided by the door 6, particularly in form of a ram air inlet 126 and a ram air scoop 127. The scoop 127 collects and catches ambient air during movement of the vehicle, which will be to the left in FIG. 15. The collected air is pressed into the ram air channel 120 through the ram air inlet 126.

Figure 16:
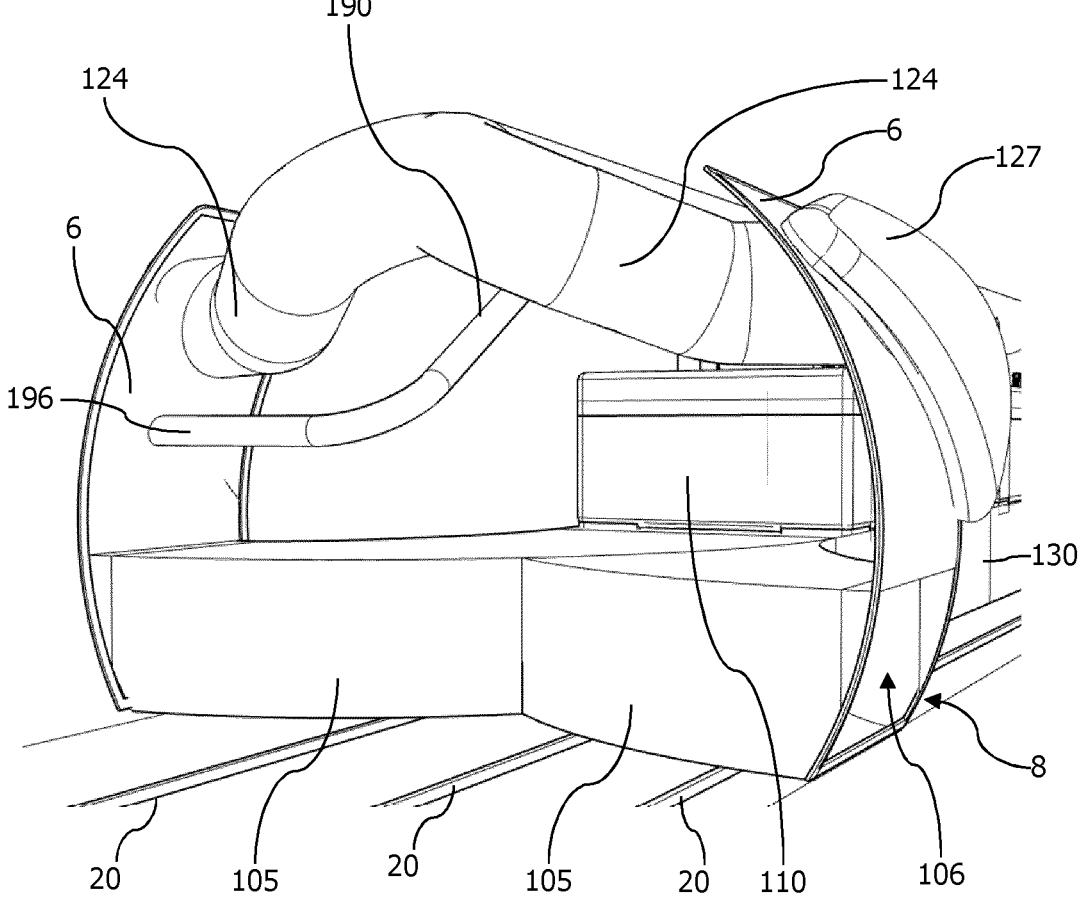

The illustrated dispersion unit 105 has two branches, one leading to the door 6 visible in FIG. 15, and one leading to an opposite door 6, which is schematically illustrated in FIG. 16. Specifically, the vehicle 1 may have at least two door openings 5 arranged opposite to one another, which is often present in trains, aircrafts or buses. Thus, both door openings 5 can be closed by a door 6 of the dispersion system 10.

The ram air sources 124 provided at/with each door 6 can be fluidly coupled and supply their ram air into a single ram air channel 120. Likewise, the dispersion unit 105 at each door 6 can form a Y-shaped dispersion unit 105 being in fluid communication with a single outlet channel 130 and both through holes 8 in the opposite doors 6. This allows dispersing the medium from one or more or all tank modules 100 through the dispersion unit 105 and on both sides of the vehicle.

As can be derived from FIG. 16, the dispersion system 10 can be mounted to seat rails 20 or similar attachment points on a floor of the vehicle 1. In certain vehicles 1 such seat rails 20 are provided in a manner that passenger seats on both sides of an aisle (not illustrated) can be mounted into the vehicle 1. Thus, both rows of passenger seats can be removed from the vehicle and a single dispersion system 10 can be installed as partly illustrated in FIG. 16.

Alternatively, two or more dispersion systems 10 can be installed next to each other on respective (cross-sectionally opposite) sides of the vehicle 1 as with the rows of passenger seats removed from the vehicle 1. In this case, one dispersion system 10 provides the medium from the associated reservoirs 110 to one through hole 8 of one door 6 on the side of the vehicle 1, where the respective dispersion system 10 is installed. This allows dispersing medium on each side of the vehicle, as required for the particular dispersing task. Only as an example, if a herbicide is to be dispersed on one side of a railroad track, street or flight route, the dispersion system 10 of the corresponding side of the vehicle 1 can be controlled to release the medium (herbicide).

Also alternatively, the Y-shaped dispersion unit 105 illustrated in FIG. 16, can include a shield, a valve or flap (not illustrated) which can guide the medium from the (single) outlet channel 130 to only one through hole 8 on one side of the vehicle 1. Thus, the outlet side can be switched.

FIG. 17 schematically illustrates a vehicle 1 comprising a dispersion system 10. The vehicle 1 is illustrated in FIG. 17 as an aircraft, which is only one possible example. The vehicle can comprise a passenger door 6 having a corresponding door opening 5 as well as a cargo door 9 having a corresponding door opening 5. Each of these doors can be used for the dispersion system 10. On the one hand, the tank modules 100 and dispersion unit 105 can be brought into the aircraft 1 through the corresponding door opening 5, and the door opening 5 is then closed by the door 6 of the dispersion system 10.

The dispersion system 10 can be installed in a passenger cabin as illustrated in FIG. 17. Alternatively or additionally, the dispersion system 10 or a further dispersion system 10 (not illustrated) can be installed in a cargo space of the vehicle (which would be behind the cargo door 9 towards the tail of the vehicle 1, to the right in FIG. 17).

In any case, the vehicle 1 can be reconfigured to a dispersing vehicle in a very fast manner and, after performing the dispersion task, can be configured back to its original purpose, such as a passenger aircraft, train, bus or the like.

The above description of the drawings is to be understood as providing only exemplary embodiments of the present invention and shall not limit the invention to these particular embodiments.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A dispersion system for a vehicle having at least one door opening and an interior space, the system comprising:

at least two tank modules including a reservoir for storing a medium to be dispersed, each tank module being configured to fit through the door opening;

a door configured to fit into one of the at least one door opening and comprising a through hole; and a dispersion unit having a dispersion channel in fluid communication with the reservoir of the at least two tank modules and the through hole of the door, characterized in that each tank module further comprises:

an outlet channel in fluid communication with the dispersion channel; and a closure closing the reservoir with respect to the outlet channel in a fluid tight manner, wherein in each of the each tank modules, the closure is arranged between the reservoir and the outlet channel, wherein the closure comprises an elastic flap covering an opening of the outlet channel, and a controller configured to individually open the closure of each tank module, wherein the elastic flap is flat and seals the reservoir with respect to the outlet channel when the closure is in a closed position, and is bulgy when the closure moves from the closed position towards an open position, or wherein the elastic flap, when the closure moves from the closed position towards an open position, bulges to such an extent that the flap moves into the outlet channel, so that moving the closure from the closed position to the open position forms the bulgy flap, or, both.

2. The dispersion system according to claim 1, wherein the reservoir comprises a side enclosure enclosing a reservoir space, wherein the side enclosure is connected to an outer surface of the outlet channel, so that the outer surface of the outlet channel further delimits the reservoir space.

3. The dispersion system according to claim 1, further comprising:

a further door configured to fit into one of the at least one door opening and comprising a through hole; and a further dispersion unit having a further dispersion channel in fluid communication with the reservoir of the at least two tank modules and the through hole of the further door.

4. The dispersion system according to claim 1, wherein the closure comprises a raising device configured to raise the closure from a closed position to an open position, wherein in the open position the reservoir is in fluid communication with the outlet channel.

5. The dispersion system according to claim 4, wherein the raising device comprises at least one actuator, or rocker, or both configured to raise the closure.

6. The dispersion system according to claim 1, wherein the outlet channel comprises a top wall with the opening.

7. The dispersion system according to claim 6, wherein at least one corner or edge of the flap is coupled to the closure.

8. The dispersion system according to claim 6, wherein the flap comprises at least one ridge along an edge of the opening at a surface of the flap facing the outlet channel, or at least one ridge at a surface facing the reservoir, or both.

9. The dispersion system according to claim 1, further comprising:

a supply line fluidly connecting a fill nozzle or filler pipe with each reservoir of the at least two tank modules.

10. The dispersion system according to claim 9, wherein each of the at least two tank modules comprises a supply valve configured to be connected to the supply line and closing and opening the fluid connection between the supply line and the reservoir.

11. The dispersion system according to claim 1, further comprising:

a ram air channel connecting a ram air source with the outlet channel, or each reservoir of the at least two tank modules, or both.

12. The dispersion system according to claim 11, wherein the door comprises a ram air inlet, or a ram air scoop, or both forming the ram air source and configured to collect ambient air from an environment outside of the vehicle and to guide the ambient ram air into the ram air channel, or wherein each tank module further comprises a ram air valve configured to regulate a volume flow of ram air from the ram air channel into the respective reservoir, or both.

13. The dispersion system according to claim 1, wherein at least one tank module further comprises a storage space for a powdery agent, or a granular agent, or a powdery and granular agent.

14. The dispersion system according to claim 13, wherein the at least one tank module further comprises a conveyor configured to convey the powdery agent, or the granular agent, or the powdery and granular agent towards the dispersion unit, or the outlet channel, or both, or wherein the storage space is arranged inside of the outlet channel, or both.

15. A vehicle, comprising:

the dispersion system according to claim 1.

16. The vehicle of claim 15, further comprising:

a plurality of a seat rails configured to receive a mount of a passenger seat, wherein each tank module is configured to be mounted to the plurality of seat rails.

17. A dispersion system for a vehicle having at least one door opening and an interior space, the system comprising:

at least two tank modules including a reservoir for storing a medium to be dispersed, each tank module being configured to fit through the door opening;

a door configured to fit into one of the at least one door opening and comprising a through hole; and a dispersion unit having a dispersion channel in fluid communication with the reservoir of the at least two tank modules and the through hole of the door, characterized in that each tank module further comprises:

an outlet channel in fluid communication with the dispersion channel; and a closure closing the reservoir with respect to the outlet channel in a fluid tight manner, wherein in each of the tank modules, the reservoir is arranged on top of the outlet channel, wherein the closure comprises an elastic flap covering an opening of the outlet channel, and a controller configured to individually open the closure of each tank module, wherein the elastic flap is flat and seals the reservoir with respect to the outlet channel when the closure is in a closed position, and is bulgy when the closure moves from the closed position towards an open position, or wherein the elastic flap, when the closure moves from the closed position towards an open position, bulges to such an extent that the flap moves into the outlet channel, so that moving the closure from the closed position to the open position forms the bulgy flap, or, both.

* * * * *